(12) United States Patent
Li

(10) Patent No.: US 9,869,439 B2
(45) Date of Patent: Jan. 16, 2018

(54) ADVANCED CONTROL OF IMITATION CANDLE DEVICES

(71) Applicant: Xiaofeng Li, Shenzhen (CN)

(72) Inventor: Xiaofeng Li, Shenzhen (CN)

( * ) Notice: Subject to any disclaimer, the term of this patent is extended or adjusted under 35 U.S.C. 154(b) by 0 days.

(21) Appl. No.: 15/441,143

(22) Filed: Feb. 23, 2017

(65) Prior Publication Data

US 2017/0307159 A1 Oct. 26, 2017

Related U.S. Application Data

(63) Continuation-in-part of application No. 15/145,739, filed on May 3, 2016, now Pat. No. 9,605,824.

(30) Foreign Application Priority Data

Apr. 25, 2016 (CN) .......................... 2016 1 0261921
Jul. 15, 2016 (CN) .......................... 2016 1 0559957
(Continued)

(51) Int. Cl.
*H05B 33/08* (2006.01)
*F21S 10/04* (2006.01)
(Continued)

(52) U.S. Cl.
CPC ............. *F21S 10/046* (2013.01); *F21S 6/001* (2013.01); *F21S 9/02* (2013.01); *F21S 10/043* (2013.01);
(Continued)

(58) Field of Classification Search
CPC ............ H05B 33/0815; H05B 33/0818; H05B 33/0845; H05B 33/0809; H05B 33/0848;
(Continued)

(56) References Cited

U.S. PATENT DOCUMENTS 6,491,516 B1 * 12/2002 Tal .......................... A47G 33/00
273/147
1,019,578 A1 8/2011 Wells
(Continued)

FOREIGN PATENT DOCUMENTS

CN 201093300 Y 7/2008
CN 204268356 U 4/2015
(Continued)

OTHER PUBLICATIONS

German Office Action issued for German Patent Application No. 102016008225.9, dated Dec. 19, 2016.
(Continued)

*Primary Examiner* — Douglas W Owens
*Assistant Examiner* — Syed M Kaiser
(74) *Attorney, Agent, or Firm* — Perkins Coie LLP

(57) ABSTRACT

The disclosed embodiments relate to devices and methods for facilitating the operations and usage of electronic candle devices. In one exemplary aspect, an imitation candle device is disclosed. The imitation candle device comprises a body; a flame element protruding from top of the body; one or more light sources providing illumination for the flame element to produce an appearance of a true fire flame; a tapered chamber with an opening; a sensor component positioned at an end of the tapered chamber, the sensor component operable to produce an electrical signal in response to an input signal; and an electronic control circuitry coupled to the power supply operable to: receive the electrical signal, classify the electrical signal into a category among a plurality of categories, and control at least an output of the one or more light sources based on the electrical signal and the category of the electrical signal.

31 Claims, 19 Drawing Sheets

(30) Foreign Application Priority Data

Feb. 8, 2017 (CN) .......................... 2017 1 0051323
Feb. 8, 2017 (CN) .......................... 2017 1 0051323

(51) Int. Cl.
*H05B 37/02* (2006.01)
*F21S 9/02* (2006.01)
*F21S 6/00* (2006.01)
*F21Y 115/10* (2016.01)

(52) U.S. Cl.
CPC ..... *H05B 33/0854* (2013.01); *H05B 33/0872* (2013.01); *H05B 37/0236* (2013.01); *H05B 37/0272* (2013.01); *F21Y 2115/10* (2016.08)

(58) Field of Classification Search
CPC ............ H05B 33/0896; H05B 37/0272; H05B 37/0227
USPC ......................................... 315/291, 294, 307
See application file for complete search history.

(56) References Cited

U.S. PATENT DOCUMENTS

| | | | | |
|---|---|---|---|---|
| 2004/0089289 | A1* | 5/2004 | Tingley | F24B 1/193 |
| | | | | 126/500 |
| 2005/0007779 | A1* | 1/2005 | Nozawa | F21S 10/04 |
| | | | | 362/253 |
| 2006/0192503 | A1* | 8/2006 | Trombetta | F21S 6/001 |
| | | | | 315/308 |
| 2008/0151571 | A1 | 6/2008 | Chen | |
| 2009/0213597 | A1* | 8/2009 | Nelkin | F21K 9/00 |
| | | | | 362/392 |
| 2010/0207538 | A1 | 8/2010 | Chen | |
| 2011/0000666 | A1* | 1/2011 | Couto | F22B 1/1853 |
| | | | | 166/272.3 |
| 2011/0195787 | A1* | 8/2011 | Wells | G07F 9/026 |
| | | | | 463/42 |
| 2012/0093491 | A1 | 4/2012 | Browder et al. | |
| 2013/0050985 | A1* | 2/2013 | Kwok | F21S 6/001 |
| | | | | 362/96 |
| 2014/0035483 | A1* | 2/2014 | Becker | F21S 9/02 |
| | | | | 315/294 |
| 2014/0140042 | A1 | 5/2014 | Scrreiber | |
| 2014/0286024 | A1 | 6/2014 | Li | |
| 2014/0268652 | A1 | 9/2014 | Li | |
| 2015/0070874 | A1 | 3/2015 | Beesley | |
| 2016/0029461 | A1 | 1/2016 | Noh et al. | |
| 2016/0057829 | A1* | 2/2016 | Li | H05B 33/0827 |
| | | | | 315/313 |
| 2017/0191632 | A1* | 7/2017 | Li | F21S 10/043 |

FOREIGN PATENT DOCUMENTS

| | | |
|---|---|---|
| DE | 212011100014 U1 | 4/2012 |
| DE | 202015000490 U1 | 3/2013 |
| DE | 202013012047 U1 | 2/2015 |
| DE | 202015102274 U1 | 5/2015 |
| EP | 1639291 B1 | 5/2009 |
| GB | 2267746 A | 12/1993 |
| GB | 2443926 A | 5/2008 |
| GB | 2527626 A | 12/2015 |
| WO | WO2012099718 A1 | 7/2012 |
| WO | WO2013020439 A1 | 2/2013 |
| WO | WO2014139483 A1 | 9/2014 |
| WO | WO2016000517 A1 | 1/2016 |

OTHER PUBLICATIONS

Canadian Examination Report issued for Canadian Patent Application No. 2930099, dated Jan. 5, 2017.
Canadian Examination Report issued for Canadian Patent Application No. 2930099, dated Aug. 15, 2016.
Combined Search and Examination Report in British Patent Application No. 1613387.8, dated Sep. 9, 2016.
Canadian Examination Report issued for Canadian Patent Application No. 2936225, dated Sep. 29, 2016.
German Office Action issued for German Patent Application No. 102016008825.7, dated Mar. 20, 2017.
Combined Search and Examination Report in British Patent Application No. 1613393.6, dated Sep. 9, 2016.

* cited by examiner

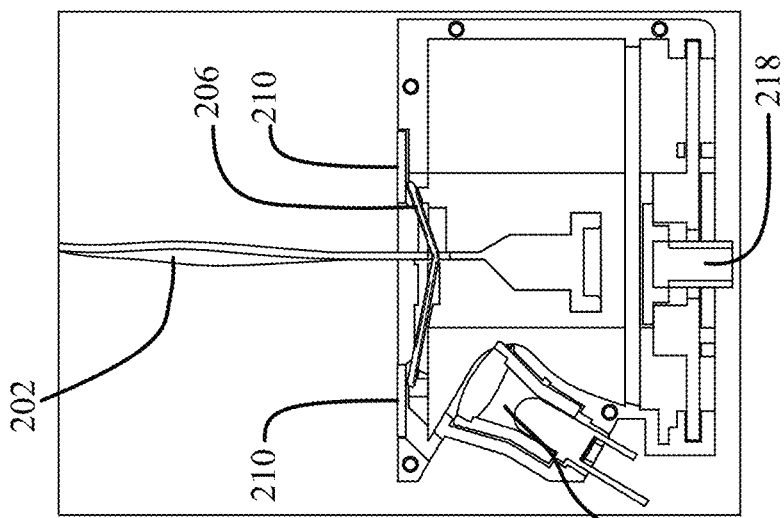
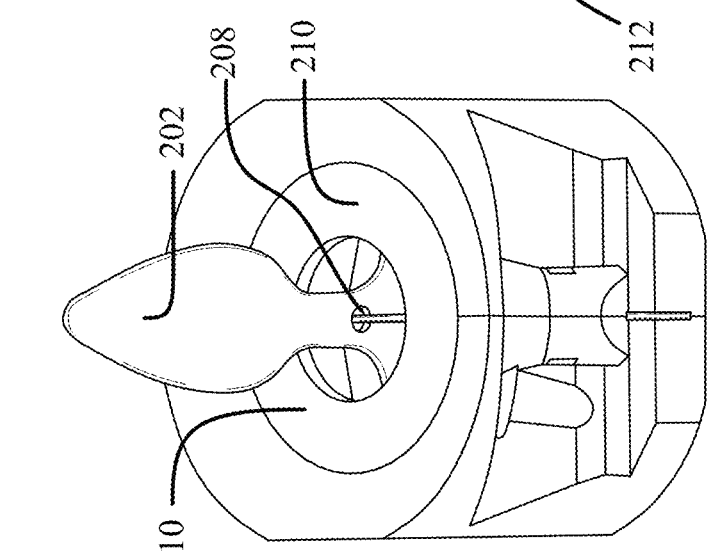
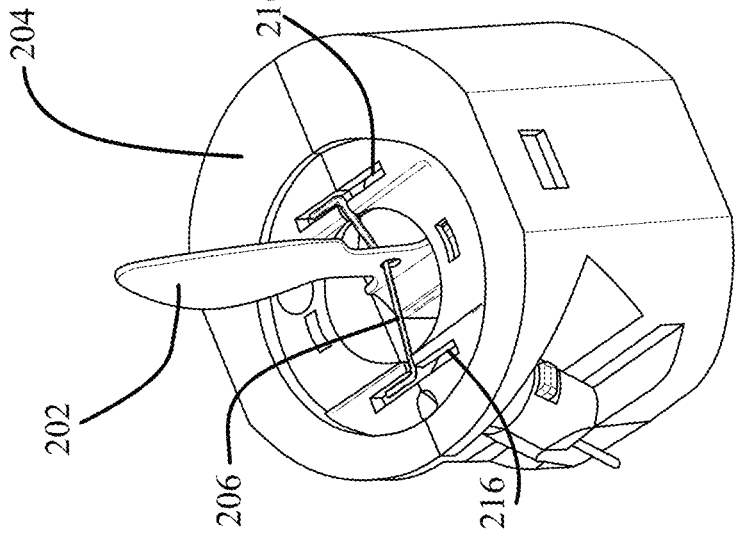

ADVANCED CONTROL OF IMITATION CANDLE DEVICES

CROSS-REFERENCE TO RELATED APPLICATIONS

This application is a continuation-in-part of U.S. patent application Ser. No. 15/145,739 filed May 3, 2016, now U.S. Pat. No. 9,605,824, entitled "IMITATION CANDLE DEVICE WITH ENHANCED CONTROL FEATURES," which claims the benefits and priorities of Chinese patent application no. CN201610261921.2 filed on Apr. 25, 2016. This application also claims the benefits and priorities of Chinese patent application no. CN2016105599579, filed on Jul. 15, 2016, Chinese patent application no. CN2017100513237, filed on Feb. 8, 2017, and Chinese patent application no. CN2017100513238, filed on Feb. 8, 2017. The entire contents of the before mentioned patent applications are incorporated by reference in this patent document.

TECHNICAL FIELD

The subject matter of this patent document relates to a candle devices that use an imitation flame, and particularly, to features that control the operation of imitation candle devices.

BACKGROUND

Traditional true flame candles, when lit, provide a pleasant ambience in many homes, hotels, churches, businesses, etc. Traditional candles, however, provide a variety of hazards including risk of fire, damage to surfaces caused by hot wax, and the possible emission of soot. Flameless candles have become increasingly popular alternatives to traditional candles. With no open flame or hot melted wax, flameless candles provide a longer-lasting, safe, and clean alternative. Such imitation candle devices often include light sources, such as LEDs, and include electronic circuits that control the operation the imitation candle device

SUMMARY

The disclosed embodiments relate to devices and methods for facilitating the operations and usage of electronic candle devices. The disclosed features enable an electronic candle device to be turned on or off by a simple user's actions including touching the imitation candle device, or blowing at or speaking to the imitation candle.

In one exemplary aspect, an imitation candle device is disclosed. The imitation candle device comprises a body; a flame element protruding from top of the body; one or more light sources providing illumination for the flame element to produce an appearance of a true fire flame; a tapered chamber with an opening, wherein the opening is flush with respect to a top surface of the body and positioned in proximity to the flame element; a sensor component positioned at an end of the tapered chamber, the sensor component operable to produce an electrical signal in response to an acoustic signal or a vibration; a power supply; and an electronic control circuitry coupled to the power supply and to the sensor component operable to: receive the electrical signal produced in response to the acoustic signal or vibration, classify the electrical signal into a category among a plurality of categories, and control at least an output of the one or more light sources based on the electrical signal and the category of the electrical signal.

In another exemplary aspect, a method of controlling an imitation candle device is disclosed. The method comprises producing an analog electrical signal in response to detection of a perturbation by a sensor component of the imitation candle device, converting the analog electrical signal to a digital signal, processing the digital signals to categorize the digital signal into a particular category of events based on a plurality of parameters of the digital signal, and controlling at least an output of one or more light sources of the imitation candle device based on the digital waveform signal and the category of the digital waveform signal.

The above and other aspects and their implementations are described in greater detail in the drawings, the description and the claims.

BRIEF DESCRIPTION OF THE DRAWINGS

FIG. 2(A) illustrates certain components including a support mechanism for an artificial flame element of an exemplary imitation candle device.

FIG. 2(B) illustrates certain components including a touch-sensitive structure of an exemplary imitation candle device.

FIG. 2(C) illustrates is a side view of FIG. 2(B) including certain internal candle components.

DETAILED DESCRIPTION

In this patent document, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Imitation candle devices can simulate a real candle with a flame that resembles a real-life flame with flickering effects using optical, mechanical and electrical components. The disclosed embodiments provide further features and functionalities that enhance the operation of these devices, and in some cases, enable additional features that cannot be obtained with real candles.

Figure 1:
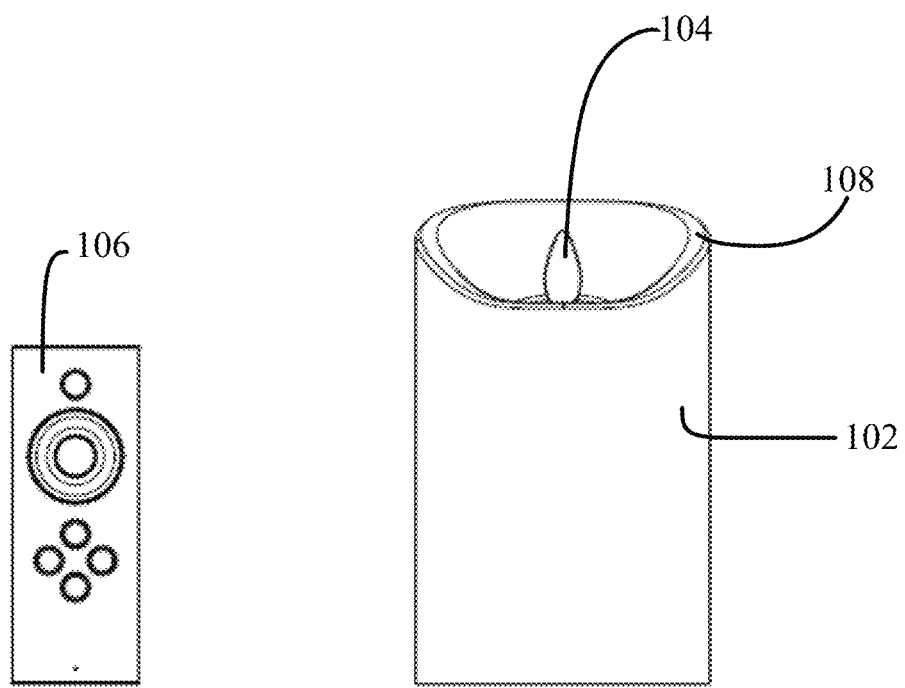
FIG. 1 illustrates an exemplary imitation candle device with an associated remote control device.

FIG. 1 illustrates an exemplary imitation candle device 102 with an associated remote control device 106 in accordance with an exemplary embodiment. The flame element 104 protrudes upward from the body of the imitation candle device 102, and the top portion 108 of the body is formed to resemble a melted candle wax to enhance the resemblance of the candle device 102 to a real candle. The remote control device 106 is configured to operate with the imitation candle device 102 via a wireless channel. For example, the remote control device 106 can include an infrared transmitter to provide various commands and signals to an infrared receiver of the imitation candle device 102. In some embodiments, other wireless communication protocols and techniques, such as Bluetooth, cellular, WiFi, etc., can be used. In certain applications, the communication channel that allows remote control of the imitation candle device can include a wired communication channel.

FIGS. 2(A), 2(B) and 2(C) illustrate some of the components of an exemplary imitations candle device including an enclosure 214 that houses the internal candle components, and a flame element 202 that protrudes from top of the enclosure 214. The flame element 202 includes a hole 208 that allows a support structure 206 to pass through the hole to suspend the flame element 202. The ends of the support structure 206 are secured within slots 216 that are formed on top of the enclosure 214. As shown in the exemplary diagram of FIG. 2(A), the support structure 206 is bent at two ends to fit within the slots 216, and the is slightly bent downwards at the location of the hole 208. The top portion of the enclosure include an indentation to accommodate a plate 210 in the form of an annulus. It should be noted that in other implementations, the plate 210 can include other shapes, such as rectangular or triangular shapes, can be configured to not fully encircle the flame element 202 and/or made smaller or larger in size. As will be described in detail below, the annulus not only operates as a decorative element to hide the internal candle components from plain view and secures the ends of the support structure 206 in place, it also enables touch-sensitive operation of the candle.

A light source 212, such as an LED, can be placed inside the enclosure 214, as shown in FIG. 2(C). The light source 212 can, for example, project light of suitable color and/or intensity to the flame element 202. In some implementations, more than one light source 212 is used to illuminate the flame element 202 from one side, and/or from both sides. In some embodiments, the light source 212 can be an incandescent light source, a plasma light source, a laser light source, or can include other suitable light producing mechanisms.

Figure 3:
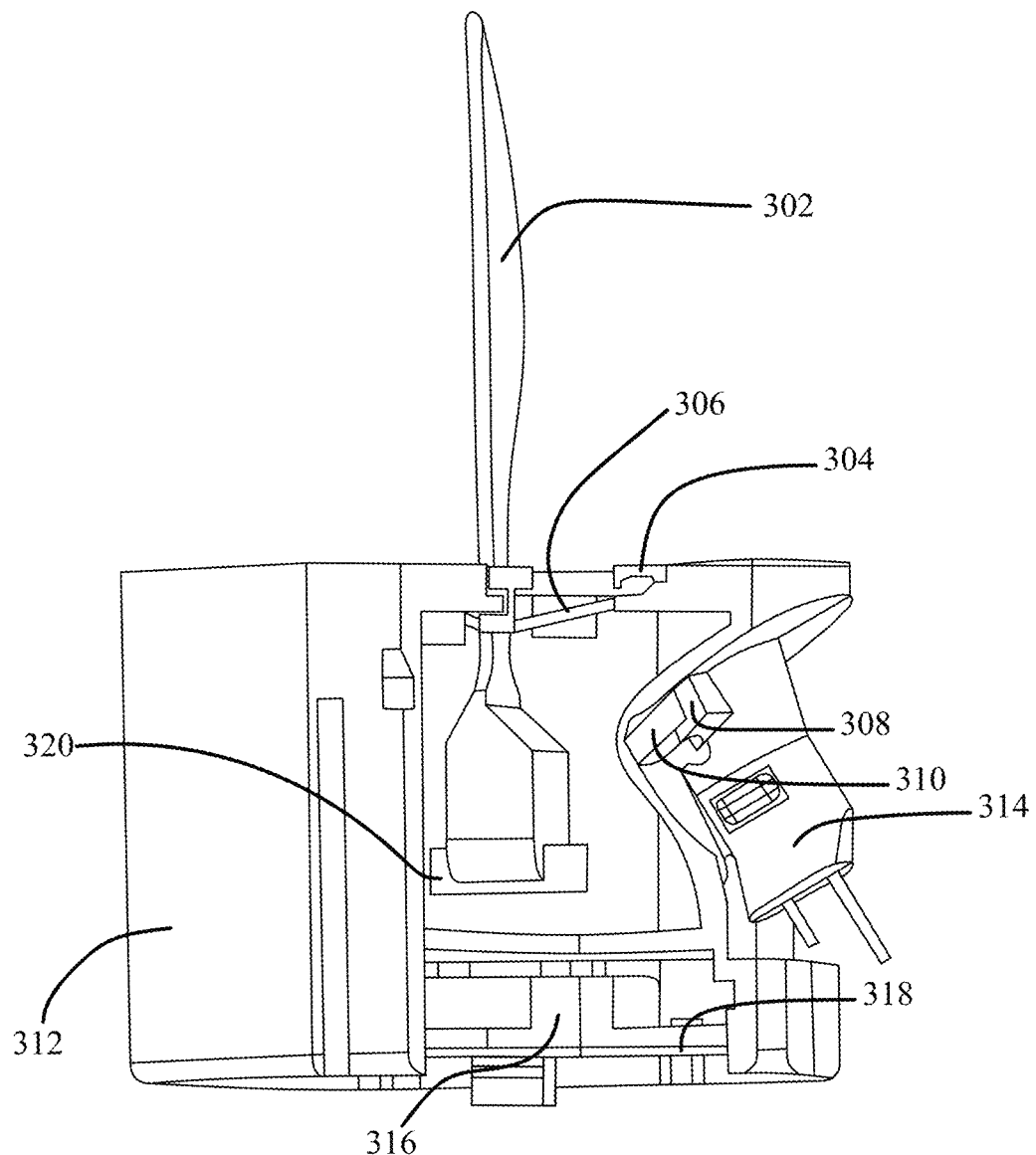
FIG. 3 illustrates components of an exemplary imitation candle device in more detail.

FIG. 3 shows additional details of the components of an exemplary imitation candled device that includes a flame element 302 that is suspended by a steel wire support structure 306. The bottom section of the flame element 302 below the steel wire support structure 306 can include a magnetic element 320 that interacts with a magnetic field produced by a coil 316. The coil 316 can be energized by control signals generated by electronic circuits that are located on, for example, a PCB board 318. In some implementations, the electronic circuits can generate pulses that cause the electromagnet to turn on and off, to vary the produced magnetic field strength, or to reverse polarity, at particular time instances. In one example, the signals that energize the coil 306 is a pulse-width modulated signal. In other examples, such signals provide an amplitude modulated, a phase modulated or a frequency modulated signal to the coil 306. Due to interactions of the magnetic element 320 with the magnetic field of the coil 306, the flame element 302 can oscillate and produce a flickering effect when illuminated by the light produced by the one or more light source 314. The imitation candle device can further include a wireless receiver component receives and decodes wireless signals transmitted thereto. For example, some components of such a wireless receiver can be located on the PCB board 318, and can operate based on one or more wireless technologies and protocols, such as infrared technology, Bluetooth or cellular protocols.

FIG. 3 also illustrates a ring 304 that is positioned on top of the imitation candle housing, around and in the vicinity of the flame element 302. In some embodiments, the ring 304 serves as a decorative piece to hide the internal components of the imitation candle device and/or to resemble melted wax. In this regard, the ring 304 can have a particular color and/or reflectivity to produce the desired visual effect when viewed under ambient illumination, or under the scattered and/or reflected illumination of the candle light source 314. In some embodiments, the ring 304 operates as a touch sensitive on-off switch. In particular, the ring 304 can be made of conductive material that forms a capacitive element in electrical connection with one or more components on the PCB board 318. When a user's finger contacts, or is within close proximity of, the ring 304, a capacitive contact is formed to complete a circuit. The touch-sensitive mechanism can be used for turning the candle on or off, or for controlling other functions of the imitation candle in a step-wise manner. For example, each touch can increase or decrease intensity of the light source 314, to switch the color of light, or to change a mode of operation (e.g., from flickering to constant intensity). In some embodiments, the touch sensitive element (shaped as a ring, or other shapes) includes two segments that are preferably poisoned at two different sides of the flame element on the top surface of the imitation candle device. In such embodiments, the two-piece touch sensitive element is configured to operate as a switch (e.g., conduct a current) only if both segments of the touch sensitive element are touched. For example, a user can touch one segment of the touch sensitive element that is positioned close to, and on one side of, the flame element with his/her thumb, and the other segment of the touch sensitive element that is positioned close to, and on an opposite side of, the flame element with his/her index finger to activate the switch and turn off the imitation candle device. As such, the multi-segment touch element can be used to simulate the appearance that the user is extinguishing the candle flame using his/her fingers.

The imitation candle device of FIG. 3 also includes a microphone 310 that is held in place within the interior of the imitation candle device by a microphone support element 308. The microphone 310 converts acoustic signals into electrical signals that are provided to an electronic component on the PCB board 318. The microphone 310 is positioned closer to the top surface of the imitation candle device to intercept sound waves that travel into the interior of the imitation candle device. For example, the top section of the imitation candle device can include an opening (e.g., the same opening that allows light from the light source 314 to reach the flame element 302) that allows the microphone to capture acoustic waves that travel down into the interior of the imitation candle device. In this way, when a user blows in the direction of the imitation flame element 302, the blow is captured by the microphone 310, and the appropriate signals are generated to turn off the imitation candle device.

The electrical signals produced by the microphone 310 can be processed by the components of the PCB board 318. The PCB board 318 can, for example, include filters, analog-to-digital circuits and/or a processor or controller (e.g., a microprocessor, a digital signal processor (DSP), an FPGA, an ASIC, etc.) that receive signals representing the captured sound waves. The processor can execute program code stored on a non-transitory storage medium, such as ROM, a RAM or other memory device, to analyze the signals corresponding to the sound waves and to determine that a blow has occurred. Upon detection of a blow, a corresponding signal can be produced to turn off the light source 314 and/or the entire imitation candle device. The program code that is executed by the processor can include an algorithm that differentiates between captured sounds of blowing air and other sounds such as clapping or human conversation.

In some embodiments, the blow detection circuitry can be implemented as a separate component from other components of the PCB board 318. For example, the blow detection can be implemented using analog or digital circuits. In some embodiments, to facilitate the detection of a blow, the microphone 310 that is mounted is coupled to an amplifier to generate an AC signal above a predetermined threshold voltage value (e.g., 200 mV), or a within a predetermined range of values (e.g., 200 mV to 3.5 V). Whereas the sound pressure/level due to a blow provides voltage values above such a threshold (or within such predetermined range of values), other sounds, such as a clapping sound, detected by the microphone can only generate an AC signal below the threshold value (e.g., at 20-100 mV), or outside of the predetermined range of values that correspond to the detection of the blow. The resulting signal of the amplifier can be further coupled to a second stage amplifier with a high amplification factor (e.g., 100 to 300 times). In some implementations, the second stage amplifier is a capacitive coupling transistor amplifier that forms a square wave that is provided to the processor to shut down the candle device. If the captured sound wave produces a signal below the threshold, such a signal does not activate the second stage amplifier (e.g., the transistor amplifier), and thus the appropriate signal for shutting down the candle device is not generated. It should be noted that, in the above description, voltage values are provided as examples to facilitate the understanding of the disclosed embodiments. It is, however, understood that other measurements, such as measured current values, may be used for identifying the blow, and/or different ranges of values may be used to effectuate the identification.

It should be noted the above description has been provided with reference to an imitation candle device with a moving flame element. It is, however, understood that the use of a microphone for blow detection can be implemented in other imitation candle configurations, such as those that utilize non-magnetic means for moving the flame element, in candle devices with a stationary flame element, or any other imitation candle device that can accommodate a microphone and the associated circuitry. Moreover, in some applications, the disclosed technology may be implanted as part of an imitation fireplace, an imitation candelabra, or other lighting fixtures. Further, in some implementations, a device other than a microphone, such as flow sensor, can be used to detect the blow.

Figure 4A:
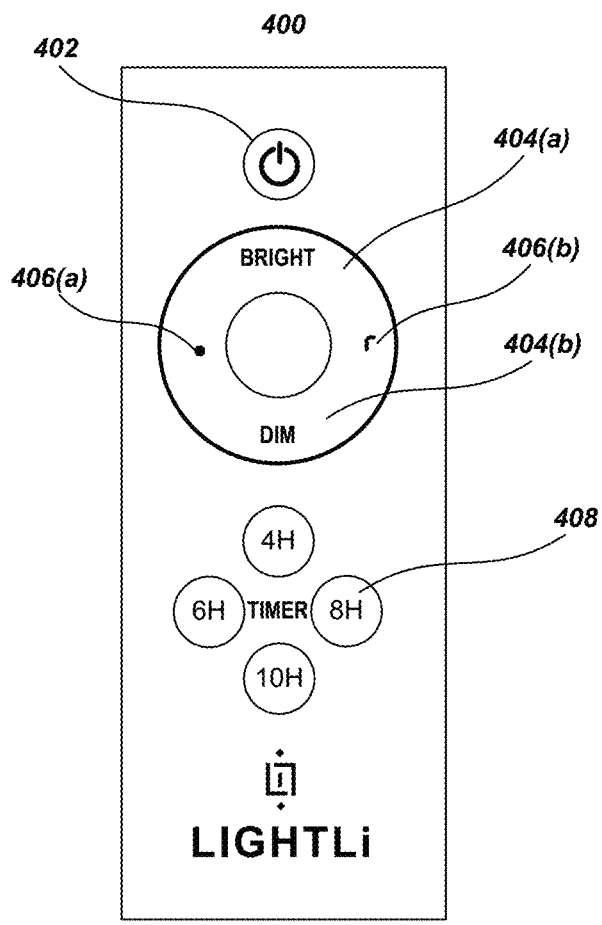
FIG. 4(A) is a picture of an exemplary remote control device for an imitation candle device.

As noted in connection with FIG. 1, the disclosed imitation candle devices may be equipped with a remote control device that enables control of various candle functionalities from a remote location. An exemplary remote control device 400 is shown in FIG. 4(A). Various buttons on the remote control device 400 enable a user to remotely control various features of one or more associated imitation candle devices. In particular, an on-off button 402 allows the imitation candle device to be turned on or off remotely. The brightness/dimness of the candle device is controlled by two switches, 404(a) and 404(b), that are positioned below the on-off button 402, and the speed of the flickering and/or movement of the candle's flame element is controlled via switches 406(a) and 406(b). The remote control device 400 further includes one or more timer buttons 408 (e.g., 4-stage timer buttons) that allow the imitation candle device to operate for any one of several timed durations (e.g., a 4-hour, a 6-hour, a 8-hour or a 10-hour duration) before the candle device is automatically turned off. To activate the timer operation, a user can, for example, press the central timer button followed by the desired duration button. The remote control device 400 can also include additional buttons (e.g., a candle selection button, a blow on-off activation button, a wireless coupling button, etc.) to enable additional operations and communications with one or more imitation candle devices.

Figure 4B:
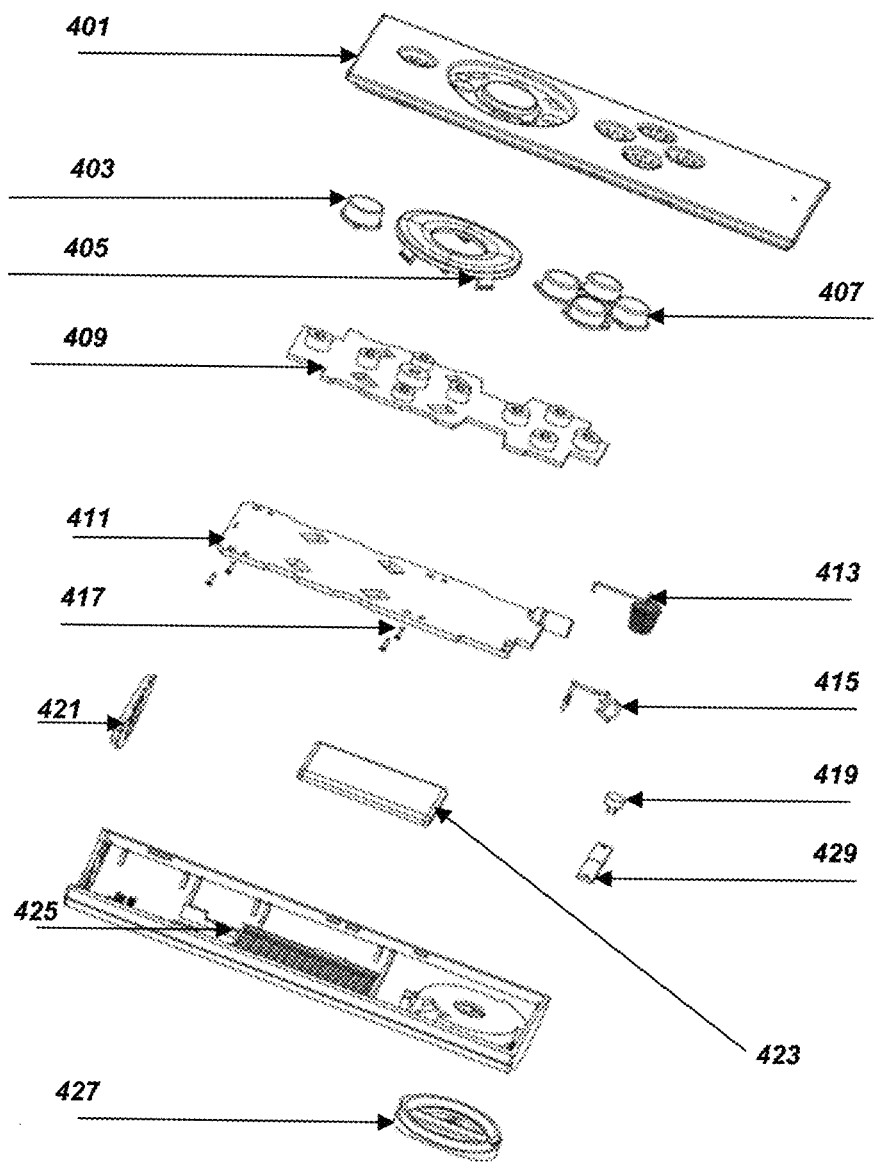
FIG. 4(B) illustrates components of the remote control device of FIG. 4(A).

FIG. 4(B) illustrates an exploded view of the components of the exemplary remote control device of FIG. 4(A). An upper cover 401 includes openings that accommodate different buttons, such as a power button 403, a circular button 405 with quad activation sections and one or more timer buttons 407. A flexible layer 409 (such as a silicone sheet) with appropriate stiffness is positioned below the buttons on top of a PCB board 411 that includes electronic circuitry. The remote control device also includes a negative side spring 413 and positive side spring 415 and screws 417. A microphone 419 is placed on a microphone board 429 to capture sounds and to generate electric signals therefrom. The remote control device may also includes a side cover 421 that allows (e.g., through a hole in the side cover 421) an infrared receiver and/or transmitter to communicate with another device. A weight 423 may also be added, as needed, to assist with obtaining the desired weight and/or balance for the remote control device. The bottom cover 425 includes a battery compartment that accommodates one or more batteries and the corresponding battery cover 427.

Figure 4C:
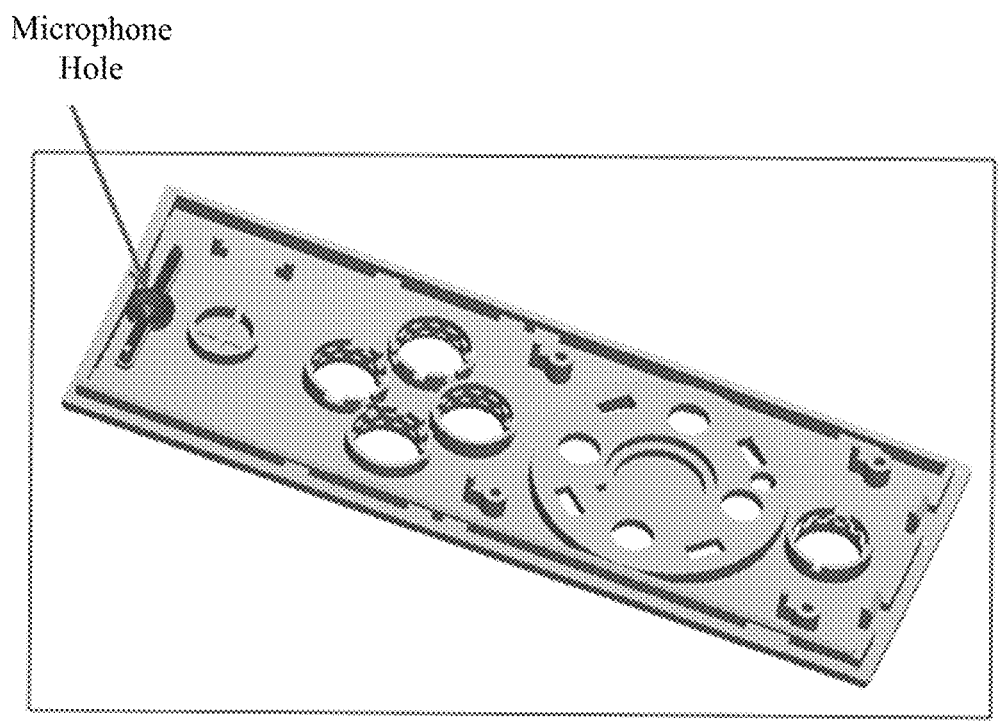
FIG. 4(C) illustrates an exemplary location of a microphone hole on the remote control device.

As evident from FIG. 4(B), the remote control device includes a microphone 419 and the corresponding circuit broad 429 that are used for capturing and identifying a blow. FIG. 4(C) illustrates an exemplary location of microphone hole on the top cover of the remote control device. Similar to the above description regarding the imitation candle device, in some embodiments, a user can blow at the remote control device in the vicinity of the microphone hole to control a functionality of the imitation candle device, such as to turn the candle off.

Figure 4D:
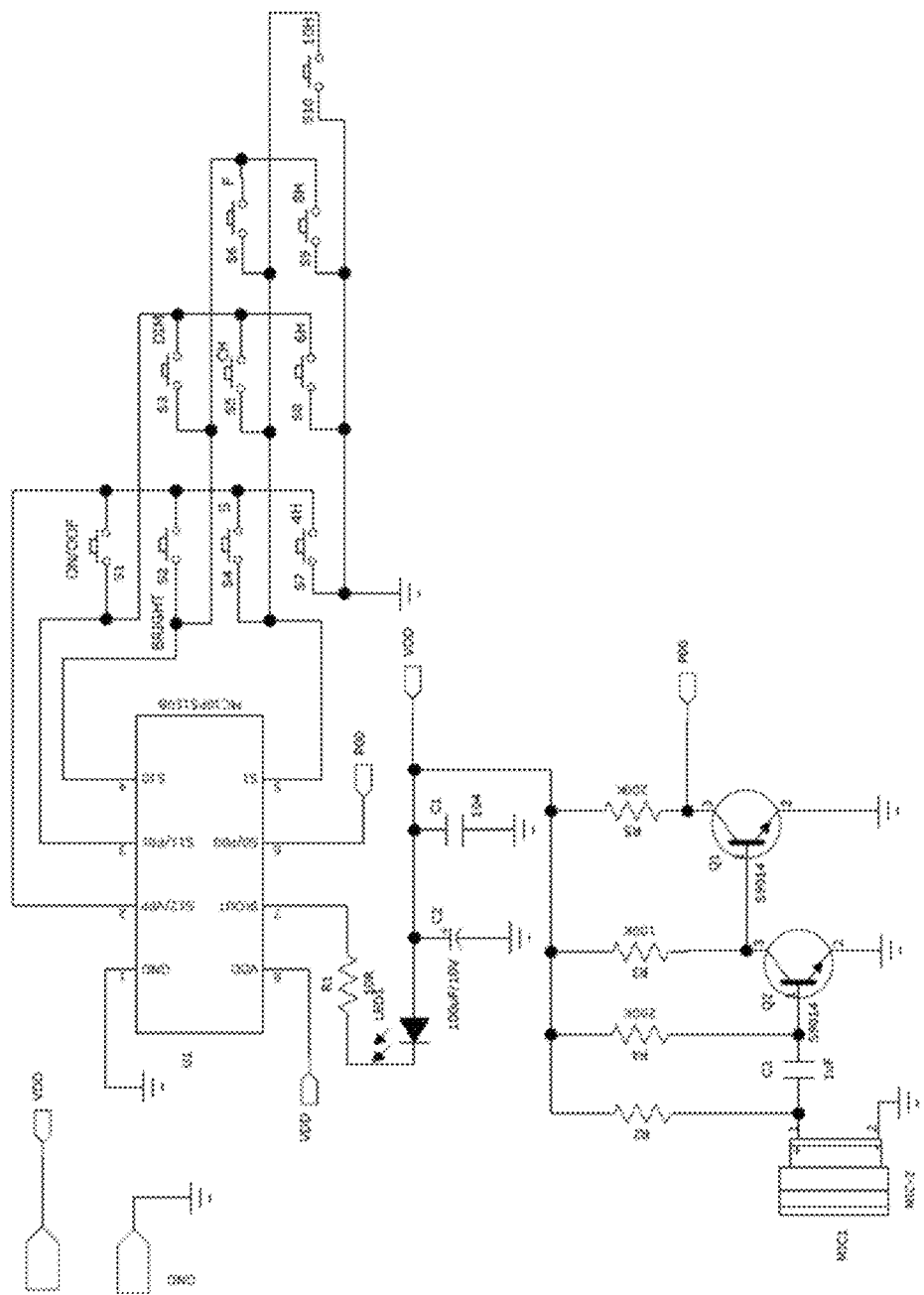
FIG. 4(D) illustrates an exemplary circuit diagram associated with a remote control device.

FIG. 4(D) illustrates an exemplary circuit diagram associated with the electrical components of the remote control device. The circuit is powered (at VDD) using a battery, such as a CR2032 lithium button battery that supplies a voltage in the range 2.2 to 3.2 V to the chip U1. In some implementations, the chip U1 includes a microprocessor. It is, however, understood that the chip U1 may include, or be designed as, an FPGA, an ASIC, a DSP, or discrete circuit components. The chip U1 controls various operations of the remote control device, such as detecting that a switch (e.g., one of switches S1 to S10) has been pressed. The chip U1 includes an IRout pin that controls an infrared LED for transmitting an infrared signal to another device. The electric current from the battery is filtered by capacitors C1 and C2 and provided to the IR LED. A microphone (MIC1) is coupled to a two-stage electronic circuitry, notably transistors Q1 and Q2 and associated biasing and amplification components (e.g., resistors R2-R5). In some embodiments, the chip U1 reaming in an idle operating status when a "high" voltage is present at an input pin that corresponds to a certain functionality, such as an on/off functionality, a timing functionality, a brightness increase functionality, a brightness decrease functionality, a pause/slow/stop flame movement functionality, a fluctuating/fast/start flame movement functionality, a blow detection functionality, and so on. In such embodiments, the chip U1 waits until a low signal occurs. For example, when a blow is directed to the microphone hole of the remote control device, a sound a wave having a certain intensity or sound pressure is produced at the head of the microphone. In an exemplary embodiment, such a blow generates an AC signal of about 200 mV or more that is subsequently amplified by 100-300 times, forming square waves that pull the appropriate input of the chip U1 to a low voltage value for a predetermined duration. As a result, the infrared transmitter is activated and a signal is transmitted to the candle device to turn the candle off. Implementing the blow detection circuits as a separate subsystem of the remote control system (as done in the exemplary diagram of FIG. 4(D)) allows the blow detection capability to be added to an existing remote control device without having to redesign the internal circuits or programming of the chip U1. In addition, implementation of the blow detection subsystem in discrete components can allow faster detection speed since additional delays due to processing by the chip U1 are avoided. As noted earlier, the disclosed embodiments also prevent inadvertent activation of this feature based on background noises and unwanted sounds. In some embodiments, the blow detection circuitry and/or associated recognition software instructions can be adapted to cause a fluttering movement of the simulated flame. For example, if the strength of the detected blow is below a particular threshold (e.g., a particular voltage value), the blow can be identified as not being strong enough to extinguish the simulated flame. As such, the detection of such a blow can cause the intensity and pattern of illumination of the flame element to change to simulate a real candle that is fluttering in the wind.

It is thus evident that, in one aspect of the disclosed technology, an imitation candle device is provided that includes a body, a flame element protruding from top of the body, one or more light sources positioned to illuminate the flame element to produce an appearance of a true fire flame, a sensor positioned within the body to detect a blow of air directed at the imitation candle device, and electronic circuitry positioned within the body to receive electrical signals produced by the sensor and to modify an output light of the one or more light sources in response to detection of the blow. In one exemplary embodiment, the sensor is a microphone that produces the electrical signals in response to detection of an acoustic wave. In another exemplary embodiment, the sensor is an air flow sensor that produces the electrical signals in response to detection of flowing air in the vicinity of the air flow sensor. In yet another exemplary embodiment, the imitation candle device includes an opening at a top section of the body in the vicinity of the flame element to receive the blow of air and to direct at least a portion of the blow to within the body.

According to another exemplary embodiment, the electronic circuitry is configured to differentiate the received electrical signals that are associated with the blow of air from the received electrical signals that are nor associated with the blow of air. For example, the received electrical signals that are not associated with the blow of air can include electrical signals associated with: an ambient noise, a clap, or a human speech. In another exemplary embodiment, the electronic circuitry includes a first stage detection circuit coupled to the sensor to receive the electrical signals produced by the sensor, and a second stage detection circuit having an input that is coupled to an output of the first stage detection circuit. The second stage detection circuit has an output that indicates the detection of the blow in response to receiving a voltage or a current value within a predetermined range from the first stage detection circuit. For example, the first stage detection circuit produces an output in the predetermined range upon detection of the electrical signals that correspond to the blow, and produces an output that is outside of the predetermined range upon detection of the electrical signals that do not correspond to the blow.

In still another exemplary embodiment, the electronic circuitry, in response to detection of the blow, turns off one or more of the light sources. In yet another exemplary embodiment, the electronic circuitry, in response to detection of the blow, turns off the imitation candle device. In some embodiments, the electronic circuitry is configured to turn off the imitation candle device in response to detection of the blow for a predetermined duration of time. In yet another embodiment, the imitation candle device further includes a touch sensitive component positioned on, or close to, an outer surface of the body to sense a touch and to produce an electrical signal in response to the detected touch that turns the imitation candle device, or the one or more of the light sources, on or off. According to another exemplary embodiment, the touch sensitive component is shaped as an annulus that encircles the flame element.

In some exemplary embodiments, the imitation candle device further includes a remote control device that is configured to transmit a signal to the electronic circuits to control one or more operations of the imitation candle device. In one exemplary embodiment, the remote control device includes an electronic circuit board and a microphone coupled to the electronic circuit board. The microphone is positioned to intercept sounds through an opening on the remote control device, to produce an electrical signal in response to the detected sounds, and to provide the electrical signals to a component on the electronic circuit board. For example, the component on the electronic circuit board can includes a two-stage detection circuitry having an output that indicates the detection of a blow of air in response to detecting a voltage or a current value within a predetermined range.

In some exemplary embodiments, the remote control device further comprises a wireless transmission device that is activated to produce a signal for transmission to a receiver device within the body of the imitation candle device upon detection of the output that indicates the detection of a blow of air. For example, the wireless transmission device can include one or more of: an infrared transmission device, a Bluetooth transmission device, or a cellular transmission device.

Figure 5A:
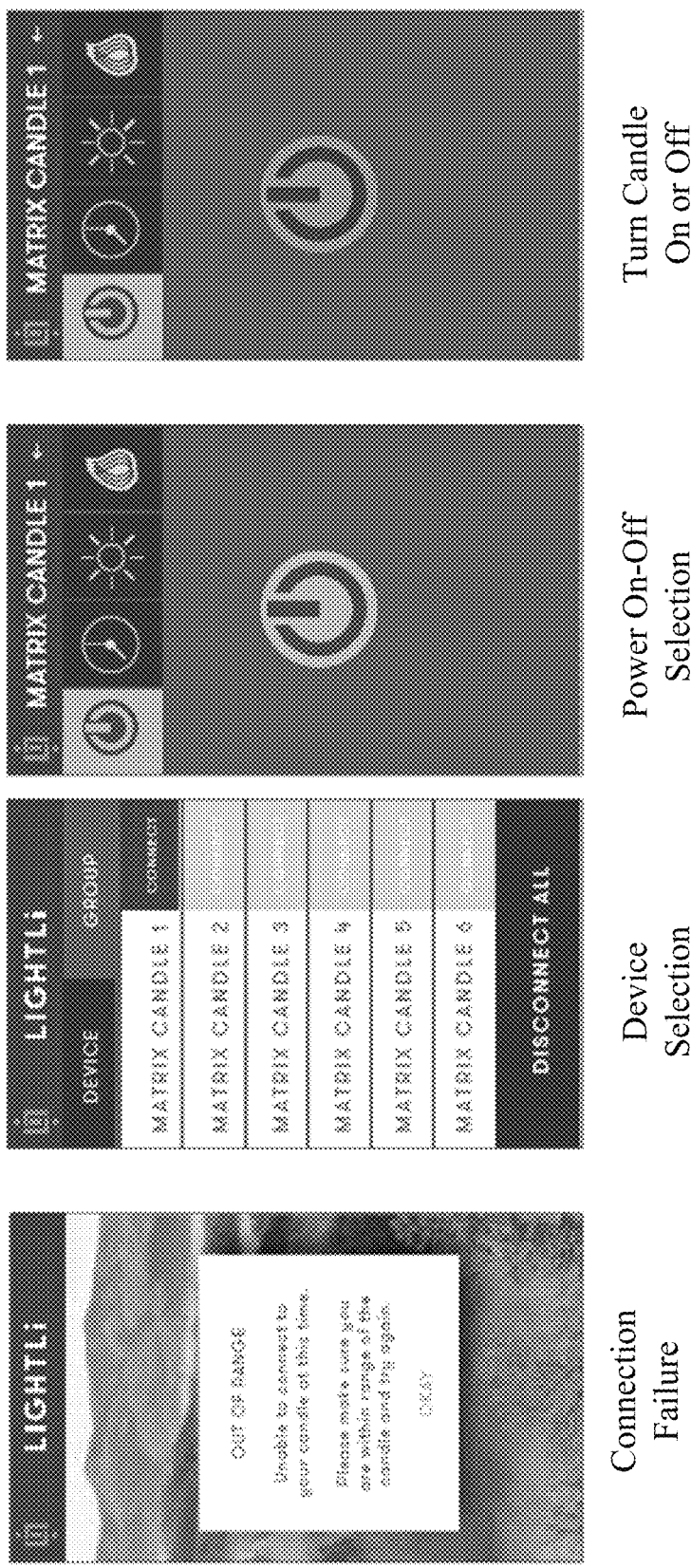
FIG. 5(A) is a series of exemplary user interface screens associated with an application for controlling the operations of an imitation candle device.
Figure 5B:
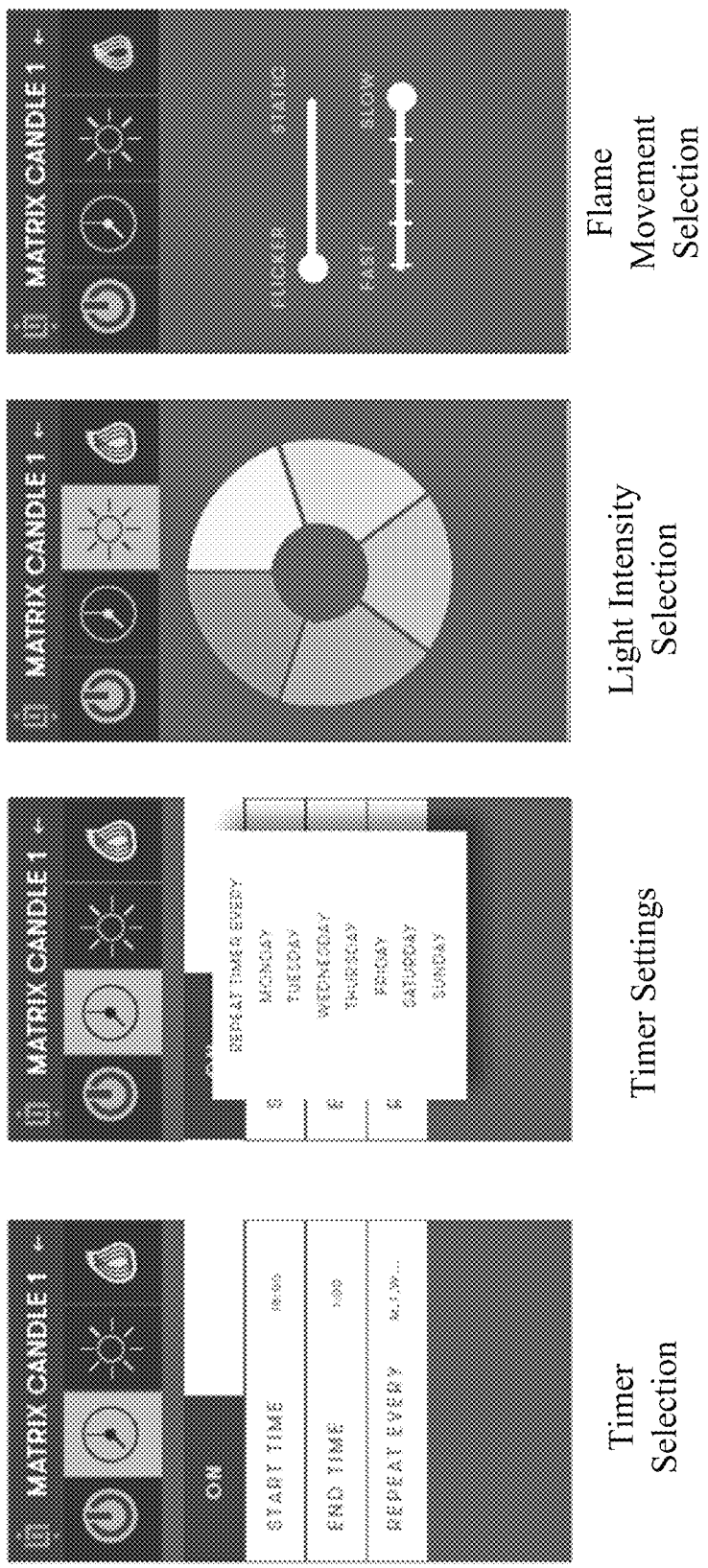
FIG. 5(B) is a series exemplary user interface screens for setting a timer and controlling illumination properties of an imitation candle device.
Figure 5C:
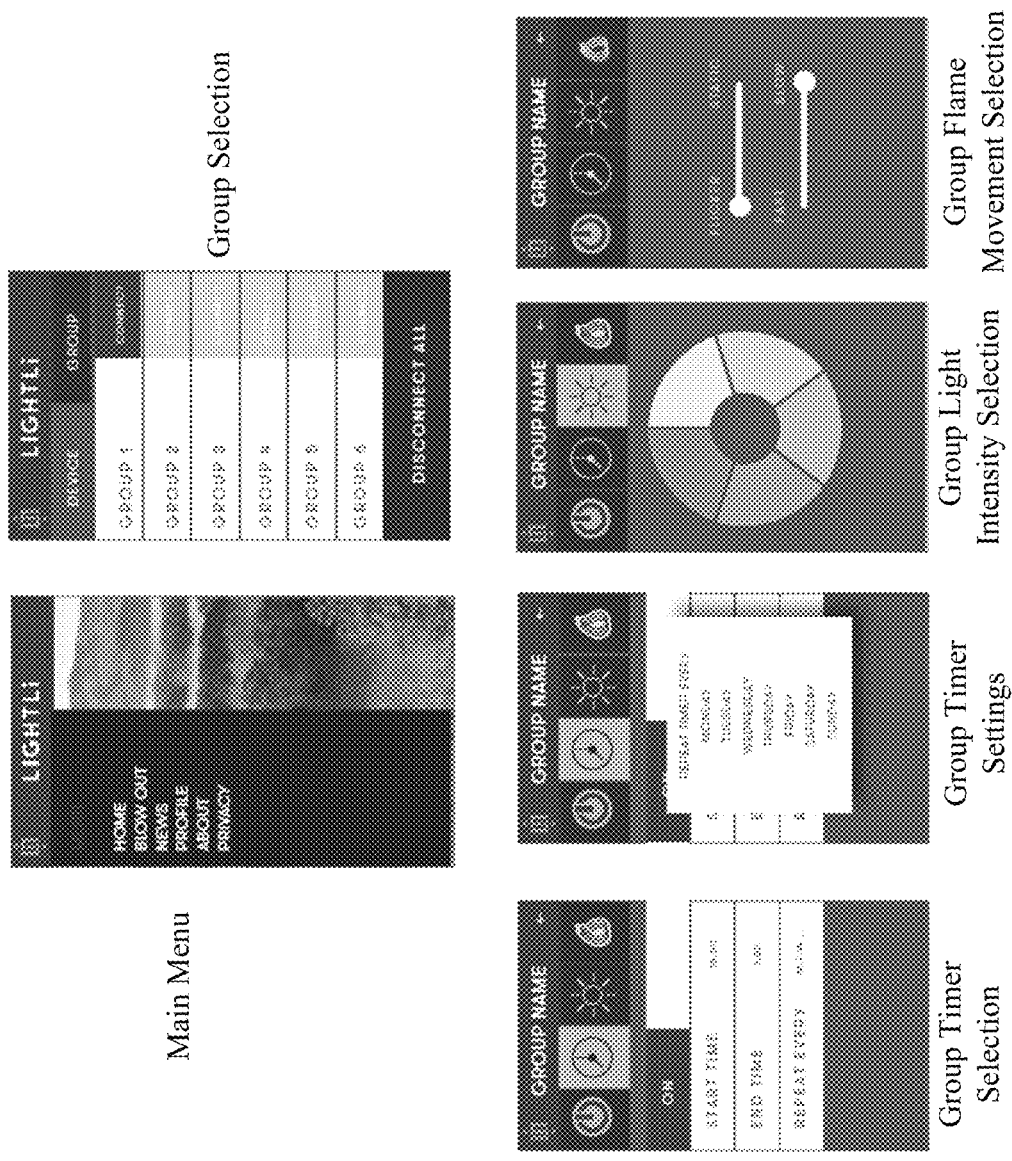
FIG. 5(C) is a series of exemplary user interface screens for controlling the operations of a group of imitation candle devices.

In some embodiments, the remote control functionalities and features are implemented as an application on an electronic device, such as a smart phone, a tablet, a laptop or similar devices. Such an application enables different features to be implemented in a user-friendly manner on a graphical user interface (GUI), and further facilitates the addition of new features and/or improvements via software updates. FIGS. 5(A) to 5(C) provide exemplary user interface screens of one exemplary application. For example, as shown in FIG. 5(A), the application can determine as to whether or not a particular imitation candle device is within the range of communication, and provides an indication if the application is unable to establish a link with one or more candles. For example, such a link can be established via Bluetooth. The application further enables a user to select a particular candle device among a plurality of candle devices, as shown in FIG. 5(A)'s selection of Matrix Candle 1. As further shown in FIG. 5(A), once a particular candle device is selected, the user interface allows the selected candle to be turned on or off by selecting the on-off button, and activating the button as needed.

FIG. 5(B) illustrates activation of additional functionalities through the user interface. In particular, in the exemplary user interface screen in FIG. 5(B), the timer selection option allows setting of a start time, an end time and repetition period. The timer setting can further be customized to activate the desired feature on particular days of the week (e.g., by clicking on or highlighting the particular day(s) of interest on the menu of the user interface). The remote application further allows the selection of an appropriate candle light intensity by, for example, clicking on one of the segments of the depicted light wheel. Such a selection allows adjustment of light intensity in order to, for example, accommodate different moods and/or different ambient lighting conditions. The movement of the flame element can also be controlled via the remote application, by, for example, selecting an amount of flicker on a sliding bar that ranges from full flicker to an appearance of a static flame. Additional control features (e.g., via a second sliding bar) may also be provided to control the speed of flickering. Upon selection of the appropriate level of light intensity and/or flame movement, the appropriate control signals are generated at the remote control device and transmitted to the imitation candle device. Upon reception of such control signals, the imitation candle device adjusts or activates/deactivates the selected features.

FIG. 5(C) illustrates additional exemplary operations and selection capabilities of the remote control application. For example, selection of an item on the Main Menu (e.g., Home, Blow Out, news, Profile, About and Privacy) allows the user to navigate through the corresponding menu item. One feature of the disclosed remote application enables the selection of a group of candle devices. Such a group can, for example, be formed by selecting individual candle devices to be part of the group, and assigning a group name (e.g., by typing a desired group name). Once a group is formed, various functionalities of the candle devices within the group can be activated and/or adjusted. For example, as shown in FIG. 5(C), group timer selection, group time settings, group light intensity selection and group flame movement selection can be made in a similar manner as described in connection with an individual candle device. Additionally, if desired, a single disconnect button on the user interface can sever communications with all devices within the group or groups.

Figure 5D:
FIG. 5(D) is an exemplary user interface screen related to a blow out feature of an imitation candle device.

The blow on-off functionality can also be activated via the user interface by selection the Blow Out item on the main menu (see FIG. 5(C)). Once the blow out functionality on the remoted device is activated, the application can provide a notification to the user (see FIG. 5(D)) that the candle device can be turned off by blowing into the microphone of the electronic device (e.g., a mobile phone). The candle application receives the signals that are produced by the device's microphone, and upon detection of the blow, generates an appropriate signal for transmission to the candle device. The candle device, upon receiving the signal from the remote control device, turns the candle off. In some implementations, the blow is detected by processing the intensity and/or pattern of data that is received from the microphone to distinguish and prevent ambient or unwanted sounds from inadvertently generating a blow off signal. Such a processing can, for example, include correlation and pattern recognition operations that produce a match only when a pattern and/or intensity of a blow is detected. In some implementations, the detection of the blow is carried out cooperatively between the remote control device and the imitation candle device.

In some embodiments, a variety of imitation candle devices (e.g., produced by the same manufacturer) can be operated by a single multi-customized remote control device (e.g., a dedicated remote control device, such as the one illustrated in FIGS. 4(A) to 4(C), or remote control implemented on an electronic device). The function buttons or selections on the remote control device allows a user to control different features of the imitation candle device (e.g., the brightness to dimness, fast to slow movement/flame, different hours of timer) for each of the imitation candle devices individually, or as a group. Such selectivity, greatly enhances the user's interactions with multiple devices, and enables detailed customization of the desired candle functions for candles that are located in different locations and ambient conditions. In one example, the remote control device is IR-based and can operate on multiple frequencies. In some embodiments, the remote control device is configured to ascertain remote control operating frequencies from other imitation candle products and devices and, once obtained, effectuate remote control of the functionalities of those devices. For example, the remote control device can attempt communicating with an unknown imitation candle device at different operating frequencies in a trial and error fashion until the unknown imitation candle device responds (e.g., turns off). In one example implementation, an infrared remote control candle operates at 32 KHz frequency. In another example, the candle can accept and receive a plurality of codes (e.g., 1 through N) to identify particular candles (e.g., entered by a user). Moreover, in some embodiments, a user may have a specific identification code that identifies a specific user.

Figure 6:
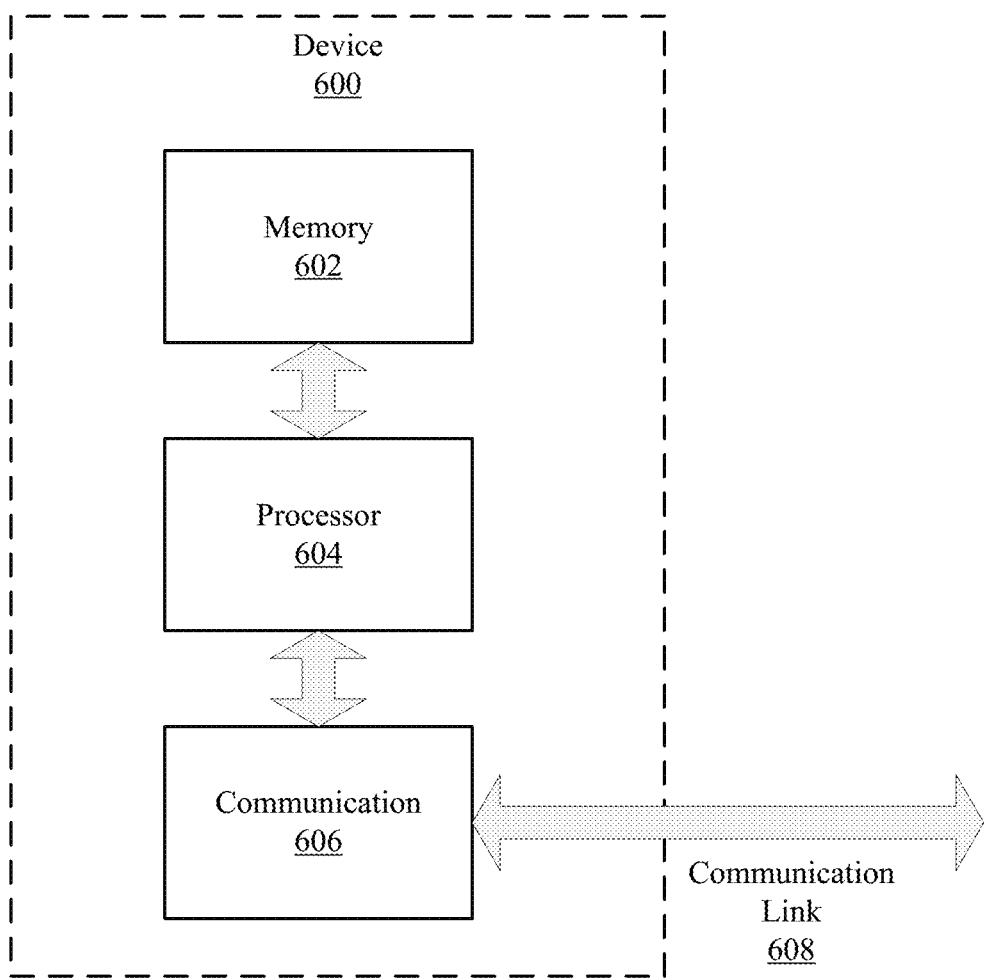
FIG. 6 is a block diagram of electronic components of a device that can be used to accommodate some of the disclosed embodiments.

FIG. 6 illustrates a block diagram of a device 600 within which some of the disclosed embodiments may be implemented. The device 600 comprises at least one processor 602 and/or controller, at least one memory 604 unit that is in communication with the processor 602, and at least one communication unit 606 that enables the exchange of data and information, directly or indirectly, through the communication link 608 with other entities, devices and networks. The communication unit 606 may provide wired and/or wireless communication capabilities in accordance with one or more communication protocols, and therefore it may comprise the proper transmitter/receiver (transceiver) antennas, circuitry and ports, as well as the encoding/decoding capabilities that may be necessary for proper transmission and/or reception of data and other information.

For example, the device 600 can facilitate implementation of an imitation candle system. Such a system includes an imitation candle device and a portable electronic device wirelessly coupled to the imitation candle device. The imitation candle device includes a body, a flame element protruding from top of the body, one or more light sources positioned to illuminate the flame element to produce an appearance of a true fire flame, and electronic circuitry to control at least an output of the one or more light sources. The electronic circuitry also includes a wireless receiver to receive wireless signals. The portable electronic device includes a display, a wireless transceiver, a processor, and a memory including processor executable code. The processor executable code, when executed by the processor, configures the portable electronic device to present a graphical user interface on the display. The graphical user display includes buttons or fields that allow activation of a blow off feature of the imitation candle device by blowing on the portable electronic device, and activation one or more of the following operations of the imitation candle device: a power-on or power-off operation, a selection of a particular imitation candle device, a selection of a timer feature, a setting of a timer value, a selection of a light intensity level, an adjustment of a light intensity level, a selection of a movement of the flame element, a setting of a level of movement of the flame element, or a selection of a group of imitation candle devices.

In one exemplary embodiment, the portable electronic device further includes a microphone. In this embodiment, the processor executable code, when executed by the processor, configures the portable electronic device to, upon activation of the blow off feature on the electronic device, detect an intensity or pattern of electrical signals produced by the microphone that correspond to a blow of air, and to activate the wireless transceiver of the electronic device to transmit a signal to the imitation candle device to allow the imitation candle device to be turned off. In some exemplary embodiments, the processor executable code, when executed by the processor, configures the wireless transceiver to, upon selection of the particular imitation candle device, transmit a signal to the particular imitation candle device to establish a wireless connection with the particular imitation candle device. In some embodiments, the wireless transceiver can be configured to operate according to a Bluetooth or a cellular wireless communication protocol.

In some embodiments, the above noted system includes one or more additional imitation candle devices. In such embodiments, the processor executable code, when executed by the processor, configures the portable electronic device to, upon the selection of a group comprising more than one imitation candle device, transmit command signals to conduct identical operations on all imitation candle devices in the group. For example, the command signals can include one or more of: an indication to change light intensity levels, an indication to change movement level of flame elements, an indication to change set timer values, an indication to turn off all imitation candle devices, or an indication to disconnect all imitation candle devices.

In one exemplary embodiment, the portable electronic device is one of a smart phone, a table device, or a laptop computer. In another exemplary embodiment, the imitation candle device further includes a magnetic drive, and a magnetic element coupled to a bottom section of the flame element that interacts with the magnetic drive to cause movement of the flame element. In yet another exemplary embodiment, the processor executable code, when executed by the processor, configures the portable electronic device to, upon the selection of a movement of the flame element and setting of the movement to a particular level, transmit a signal to the imitation candle device to cause a change in amount of movement of the flame element.

Figure 7A:
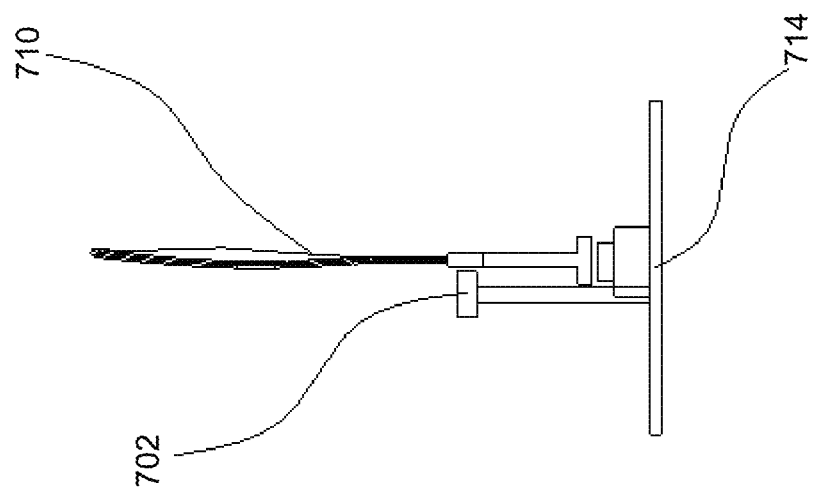
FIG. 7A shows some components of an exemplary imitation candle device.

In some embodiments, a microphone discussed above in connection with FIG. 3 can be placed in a particular location within the interior of the imitation candle device. FIG. 7A shows components of an exemplary imitation candle device, including a microphone 702 that is positioned in proximity of the flame element 710 and is electronically coupled to the central control circuit 714. In some embodiments, the microphone 702 can be replaced by an air flow sensor or a sound sensor, such as a mechanical switch that passes signals, upon sensing air flow or sound, to the central control circuit 714. The air flow and sound sensor converts airflow and acoustic signals into electrical signals that are provided to an electronic component in the central control circuit 714.

Figure 7B:
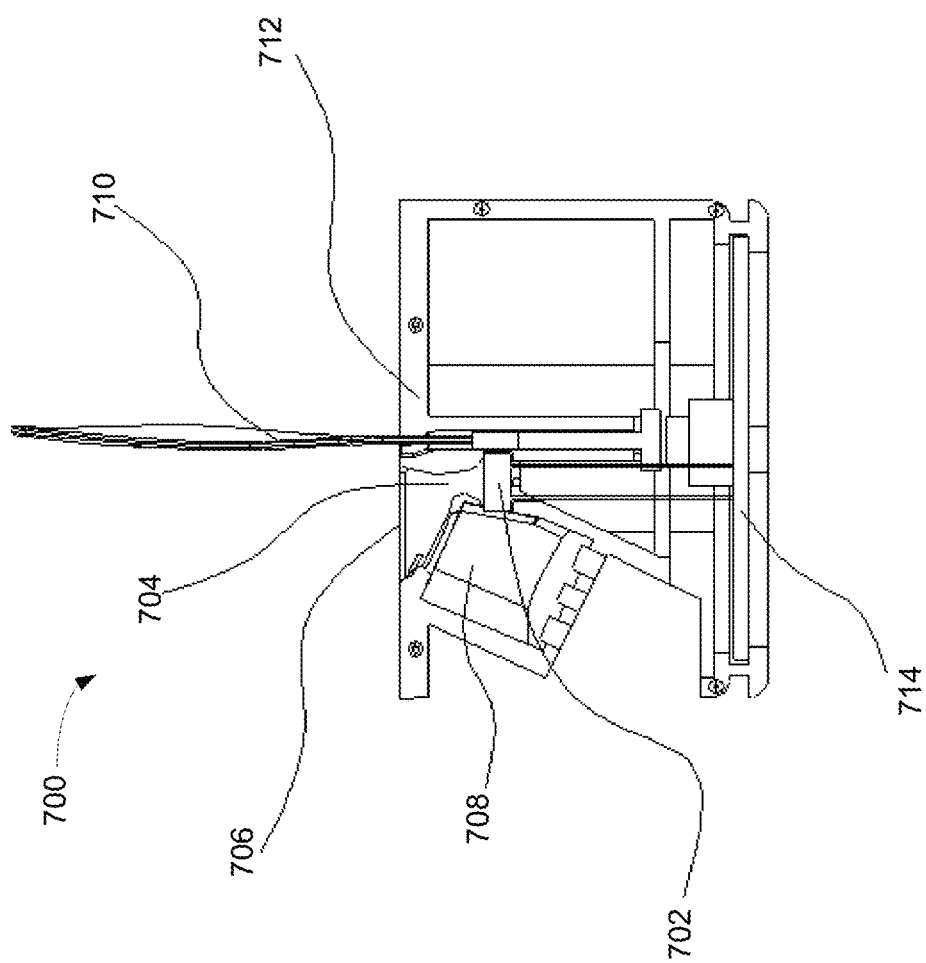
FIG. 7B shows internal structures of an exemplary imitation candle device that includes a microphone and an opening.

In some embodiments, the opening that allows the microphone to capture acoustic waves, as described above in connection with FIG. 3, is flush with respect to the top surface of the enclosure. FIG. 7B shows internal structures of an exemplary imitation candle device 700 that includes a microphone 702 and an opening 706. In this particular embodiment, the opening 706 is flush with respect to the top surface of the enclosure 712. The opening 706 leads to a chamber 704 that is formed on one side of the flame element 710 and enables the microphone to capture airflows and/or acoustic waves to travel down into the interior of the imitation candle device 700 without external interferences (e.g. ambient airflows and noises). One advantageous aspect of having an opening 706 flush with respect to the top surface of the enclosure is that, in such way, the opening 706 only allows the top-down airflow aimed at the flame element 710 to enter the conduit and prevents horizontal ambient wind to interfere with the operation of the LED lights. The proximity of the opening 706 to the flame element 710 also allows the microphone to capture part of the air from the blow that is been reflected off the flame element 710 and directed into the chamber 704.

In some embodiments, the chamber 704 has a tapered shape that gradually narrows as the it approaches the microphone 702 at the bottom. In this way, when a user blows in the direction of the imitation flame element 710, the blow is directed by the chamber 704 and captured by the microphone 702 located at the bottom of the chamber 704, and the appropriate signals are generated and transmitted to the central control circuit 714 to control imitation candle device 700, e.g. turn on/off the one or more light sources 708.

Figure 8:
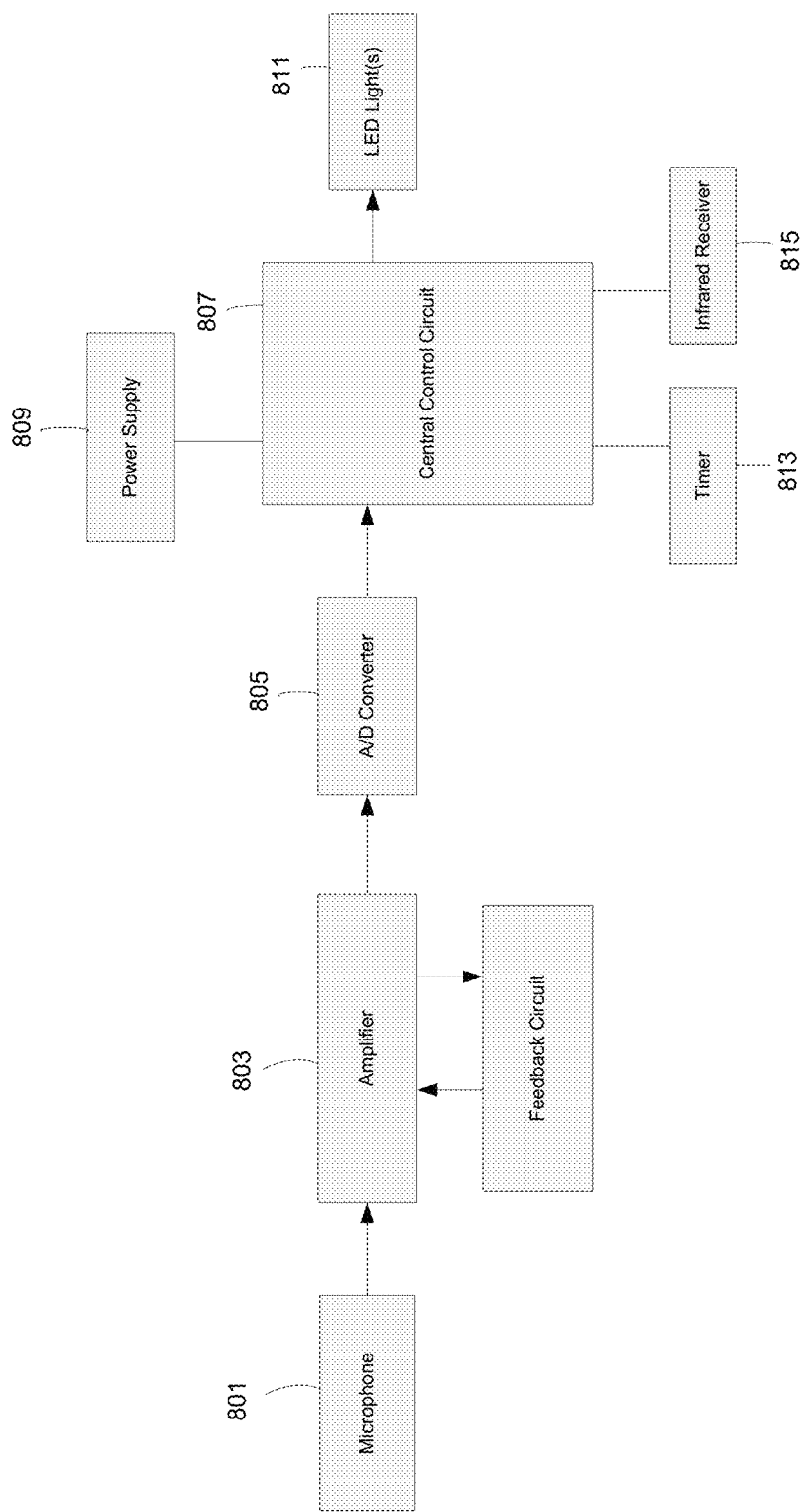
FIG. 8 shows an exemplary block diagram of signal conversion from the microphone to the central control unit.

FIG. 8 shows an exemplary block diagram of signal conversion from the microphone 801 to the central control unit 807. The microphone 801 captures the airflows and/or acoustic waves coming from the chamber of the imitation candle devices and converts them to electrical signals. The electrical signals are amplified by an amplifier 803 and converted to digital data by an analog-to-digital (A/D) converter 805. The converted digital data is then processed by the central control unit 807. After receiving the digital data, the central control circuit 807 can control other components, such as the power supply 809 and the LED lights 811, based on the received digital data that corresponds to the captured acoustic waves or airflow to turn on/off the imitation candle device or to adjust the brightness of the LED lights. In some embodiments, the central control circuit 807 may further set the timer 813 or control the infrared receiver 815 that is capable of sensing movement around the imitation candle device in response to receiving the digital data that corresponds to the captured acoustic waves or airflow.

Figure 9:
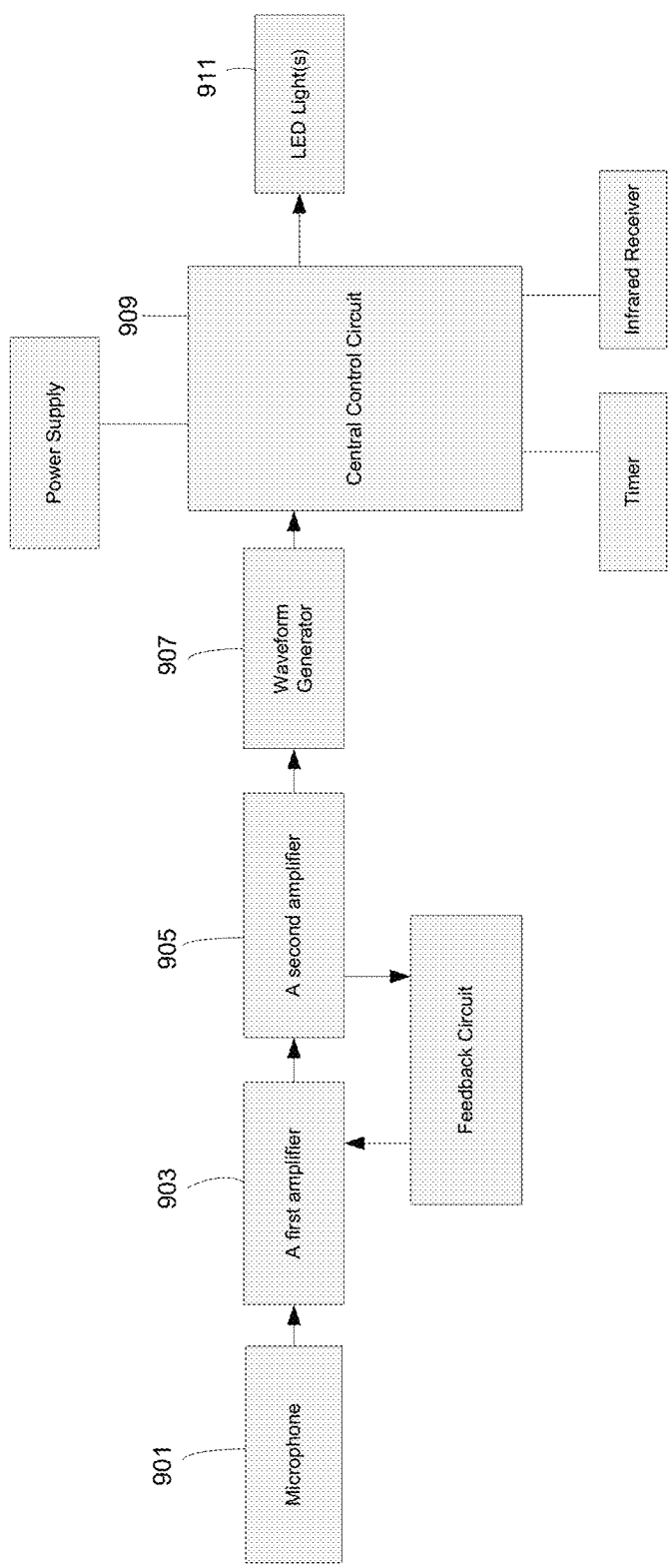
FIG. 9 shows another exemplary block diagram of signal conversion from the microphone to the central control unit.

FIG. 9 shows another exemplary block diagram of signal conversion from the microphone 901 to the central control unit 909. As discussed above, two amplifiers, a first amplifier 903 and a second circuit 905, can be used to amplify the signal captured by the microphone 901. The amplified signals are passed to a waveform generator 907 to generate wave signals that form waveforms. The central control circuit 909 controls the components of the imitation candle device, such as the LED lights 911, based on the shapes of the resulting waveforms.

In some embodiments, the central control circuit 909 can use two thresholds for the received signals to determine the desired behavior of the LED lights 911. When the amplitude of the received signals surpasses a first threshold, the control circuit 909 emits a control signal to turn off the LED light source 911. When the amplitude of the captured electrical signals is larger than a second threshold but smaller than the first threshold, the control circuit 909 emits a control signal to flicker the LED light source 911 in order to simulate a flickering movement of the flames in real candles. In some embodiments, a third threshold can be used to have two different levels of flickering speed. For example, when the signal is stronger than the second threshold but weaker than the third threshold, the control circuit 909 controls the flickering speed to be a first, slow speed. When the signal is stronger than the third threshold but weaker than the first threshold, the control circuit 909 controls the flickering speed to be a second, fast speed. In some embodiments, the flickering speed and the signal strength demonstrate a substantially linear relationship: the stronger the signal between the first and the second threshold, the faster the flickering speed.

While the central processing unit of an imitation candle device can be configured to turn the LED light source on and/or off in response to airflow and acoustic signals captured by the microphone, real candles can only be blown off (not on) and they do not react to vibration or sound. The central processing unit can also be utilized to enable additional useful functions that do not exist in real candles. For example, in some embodiments, the imitation candle device is configured to enable voice control of the imitation candle device, while at the same time it can recognize other types of perturbations, such as vibrations. In such embodiments, a waveform detection unit can be included in the central control circuit so that various input waves can be differentiated from each other.

Figure 10:
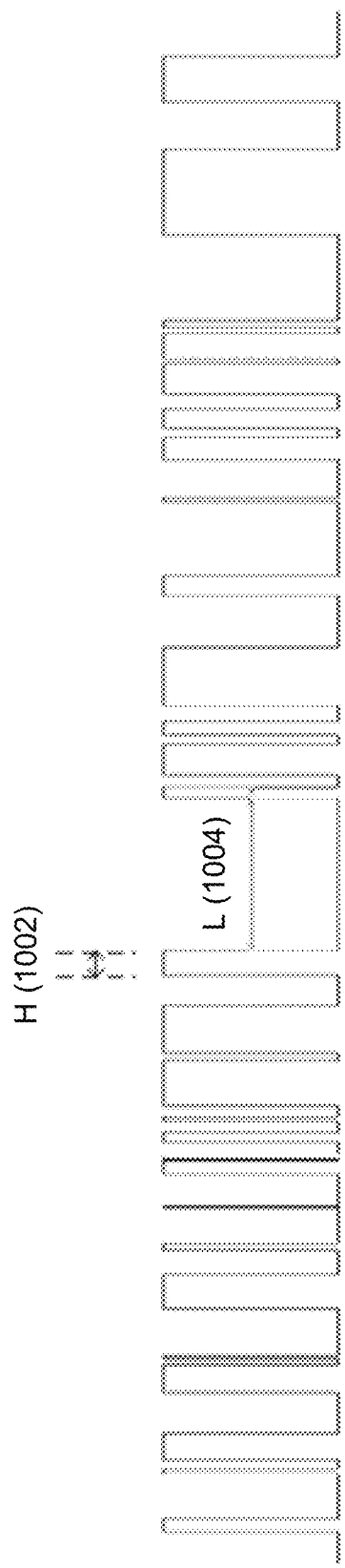
FIG. 10 shows an exemplary series of waveform signals.

The waveform detection unit receives the waveforms generated by the waveform generator 907 as shown in FIG. 9 as inputs. In some embodiments, the waveform generator 907 generates a series of square waves. FIG. 10 shows an exemplary series of waveform signals. Different parameters can be used to characterize the waveform in each cycle. For example, the waveform detection unit can measure the high amplitude signal duration H (1002) and the low amplitude signal duration L (1004). Additional parameters include frequency and maximal amplitude of the waveform within a particular cycle. The waveforms can also have other shapes. For example, the waveform generator 907 can output triangular waveforms.

Generally, at least three types of waveforms can be generated based on different inputs:
1. Waveforms corresponding to vibrations of the imitation candle device. These types of waveforms can last between 50-200 ms.
2. Waveforms corresponding to a blow-off action from a user. These types of waveforms can also last between 50-200 ms. The waveforms are correlated with the distance, strength, and time duration of the blow action. In general, it is difficult to differentiate the waveforms for vibration and blowing.
3. Waveforms corresponding to sounds uttered by a user. These types of waveforms undergo frequent changes. Each cycle of the waveform has relatively short duration.

In order to differentiate waveforms that correspond to vibrations from the other two types of waveforms, the waveform detection unit can include a low-voltage detection unit. The low-voltage detection unit detects a voltage level from the power source, and outputs a signal based on its detection. For example, in some embodiments, the voltage level from the standard C or D sized batteries is expected to be around 1.2V. When the detected voltage level is substantially lower than the expected voltage level (e.g. <0.5V), the low-voltage detection unit outputs a low level signal. When the detected voltage level is substantially similar to the voltage level of the power source (e.g. around or above 1V), the low-voltage detection unit outputs a high level signal. In some embodiments, the low-voltage detection unit detects an amplified working voltage (e.g. 3.3V) of the central control circuit instead. The low-voltage detection unit can facilitate the detection of vibration. When the imitation candle device experiences vibration, the voltage level received by the central control circuit from the power source can oscillate briefly with one or more instances of instantaneous low voltage level. The low-voltage detection unit can detect the instantaneous low voltage level and signal to other components of the waveform detection unit that possible vibration has occurred.

To further differentiate sound waveforms from blow-off waveforms, the waveform detection unit can also include an effective waveform detection unit. The effective waveform decision unit decides whether a single cycle of the waveform is a valid blow-off waveform and outputs a signal to indicate its decision. For example, the effective waveform decision unit can receive the output from the low-voltage detection unit. If the low-voltage detection unit outputs a low level signal to signal that possible vibration has just occurred, the effective waveform detection unit decides that the current cycle of waveform is an invalid blow-off waveform and discards it. If the low-voltage detection unit outputs a high level signal, the effective waveform decision unit further processes the waveform to determine various parameters of the waveform, such as the high amplitude signal duration H 1002 and the low amplitude signal duration L 1004 as shown in FIG. 10, against a set of predetermined reference values to decide if the current cycle of waveform is a valid blow-off waveform.

In some embodiments, the waveform detection unit includes one or more memories to store the set of predetermined reference values. For example, the reference values for the low amplitude signal duration L can be set within a range of 1.5 ms to 10 ms. The reference values for the high amplitude signal duration H can be set within a range of 2 ms to 300 ms. Values within these ranges allow effective differentiation of the blow-off waveforms and sound waveforms.

Figure 11:
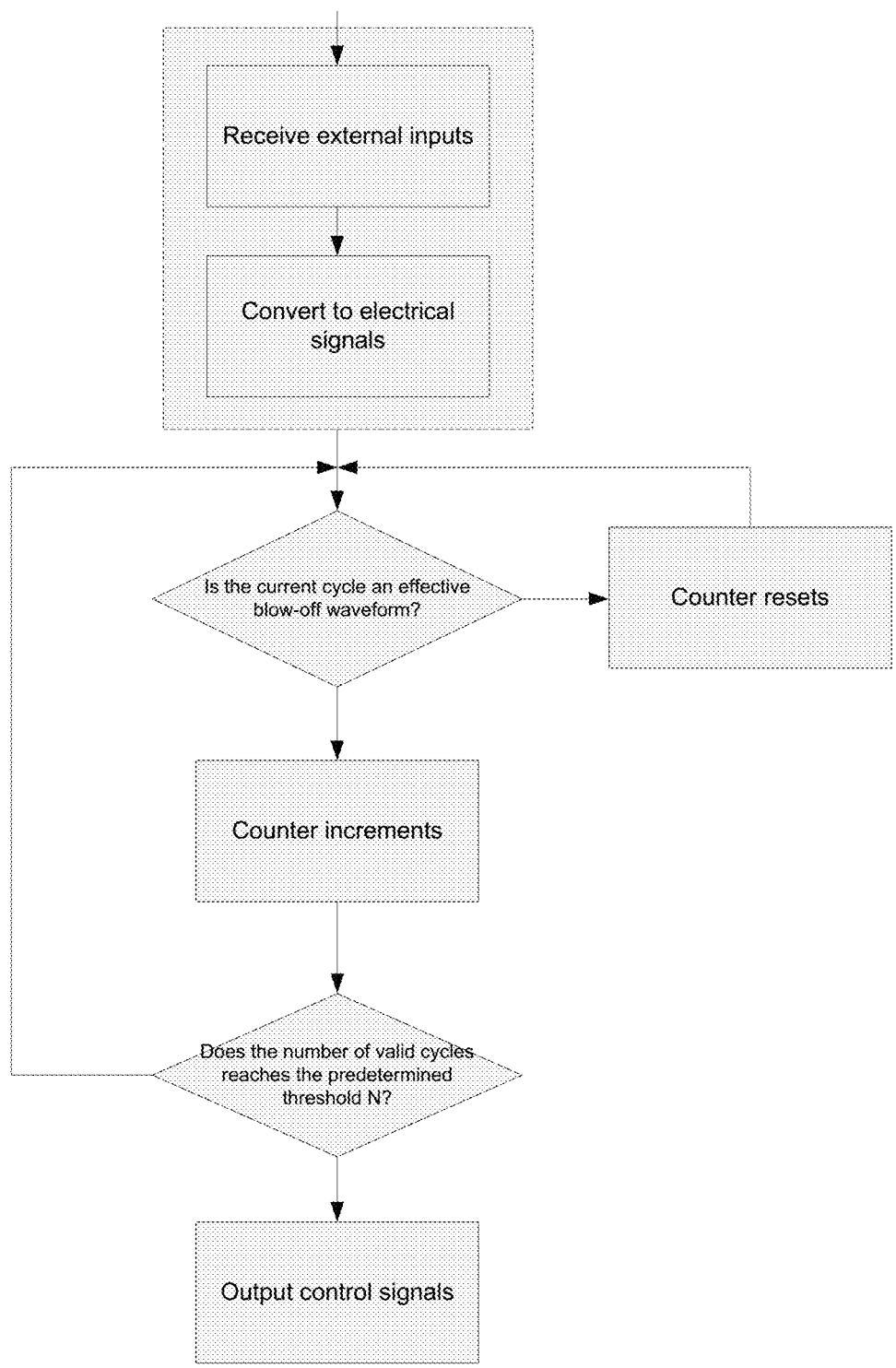
FIG. 11 shows an exemplary flowchart of the internal logic of an waveform detection unit.

The waveform detection unit may further include a counter to count the number of cycles of valid blow-off waveforms. The use of the counter enhances the reliability of the waveform detection. FIG. 11 shows a flowchart of the operations that can be performed at a waveform detection unit. In this example, the waveform detection unit implements a counter. The counter increments its count each time the effective waveform decision unit detects a cycle of a valid blow-off waveform. When the counter reaches a predetermined threshold value, N, within a predetermined duration of time, T, the waveform detection unit outputs the corresponding signals indicative of detection of a valid blow-off signal, thereby allowing the central control circuit to change the desirable behavior of the LED light source. In one example embodiment, the predetermined threshold value, N, is in a range of 5 to 20. The duration of time, T, can be determined using, for example, experimental values obtained from a collection of actual blow-off actions. In some embodiments, the duration of time, T, is between 50-200 ms.

If the effective waveform decision unit decides that all cycles of the waveform are invalid blow-off waveforms, or the counter does not accumulate sufficient counts of valid blow-off waveform cycles, the waveform detection unit can deem the input waveform as a sound waveform. In some embodiments, the detected sound waveform can be used to facilitate voice control of the imitation candle device. For example, the central control circuit can compare the detected sound waveform with one or more pre-recorded voice control commands and compute a value to indicate how closely the two signals match each other. For example, such a comparison can be carried out using a correlation operation between detected sound waveforms and the stored data indicative of various spoken commands. The comparison (or correlation) value is then compared with a predetermined matching threshold. If the value is larger than the predetermined matching threshold, the central control circuit decides that the detected sound waveform matches the pre-recorded voice control command and triggers the corresponding changes to the LED light source. For example, if the detected sound waveform matches a voice control command of "turn off the candle," the central control circuit turns off the candle accordingly. Examples of the voice control commands include: "turn off the candle", "turn on the candle", and "flicker the flame". Table 1 show some more exemplary voice control commands. Additionally, a recording device, such as a microphone, can be used to record customized voice control commands by the user. For example, a user may choose to use a voice control command of "abracadabra" to turn on the candle. Because the central control circuit performs a comparison of the sound waveforms, the voice control commands are not limited to one language or a particular dialect. For example, equivalent commands in Chinese (e.g. "Kai", "Guan", "Zhi Ma Kai Men") can be recorded and used to control the behavior of the candle. The user can periodically change the voice control commands as he or she desires.

TABLE 1

Exemplary Voice Control Commands

| Voice Commands | Desired Behavior Of The Imitation Candle Device |
|---|---|
| "Hello, candle" | Activate voice control |
| "Turn it on" | Turn on the device |
| "Turn it off" | Turn off the device |
| "Activate 5 hour timer" | Start a 5 hour timer |
| "Turn off after 5 minutes" | Turn off the device after 5 minutes |
| "Brighter" | Make the LED lights brighter |
| "Dimmer" | Make the LED lights dimmer |
| "Brightest" | Strongest lights |
| "Normal" | Normal lights |
| "Dimmest" | Weakest lights |
| "Faster" | Make the flame element movement faster |
| "Slower" | Make the flame element movement slower |
| "Stop moving" | Stop the flame element |

In some embodiments, two control signal generators are included in the central control circuit. Each of the control signal generators may include a processor and one or more memories. The control signal generators may also share the one or more memories. The first control signal generator is dedicated to blow-off waveforms after the waveform detection unit decides that the input waveforms are from a blow-off action. The first control signal generator, in some implementations, can use multiple threshold values as discussed above to determine the corresponding changes to the LED light source. For example, if the amplitude of the blow-off waveform is larger than a first threshold, the first control signal generator outputs a control signal to turn off the LED light source. If the amplitude of the blow-off waveform is larger than a second threshold but smaller than the first threshold, the first control signal generator generates a signal to flicker the LED light source. The second control signal generator is dedicated to sound waveforms after the waveform detection unit decides that the input waveforms are from sound waves. The second control signal generator compares the waveforms to pre-stored voice control commands and issues control signals accordingly to achieve the desirable lighting behavior. In some embodiments in which the imitation includes a movable flame element, the movements of the flame element, additionally or alternatively to the flickering of the LED light source, can be changed in response to detection of a valid blow. For example, if the detected blow is not deemed to be strong enough to turn the candle off, a change in the flicker of the flame element can be effectuated by changing one or more of the following: a change in flame movement, a change in LED light source flickering speed, or a change in LED light source intensity, brightness or color levels.

It is thus evident that, in one aspect of the disclosed technology, an imitation candle device can be implemented to include a body, a flame element protruding from top of the body, one or more light sources providing illumination for the flame element to produce an appearance of a true fire flame, a tapered chamber with an opening, a sensor component positioned at an end of the tapered chamber, a power supply, and an electronic control circuitry coupled to the power supply. The opening is flush with respect to a top surface of the body and is positioned in proximity to the flame element. The sensor component is operable to produce an electrical signal in response to an acoustic signal, a blow of air, or a vibration, while the electronic control circuitry is operable to receive the electrical signal produced in response to the acoustic signal, the blow of air, or the vibration, classify the electrical signal into a category among a plurality of categories, and control at least an output of the one or more light sources based on the electrical signal and the category of the electrical signal.

In some embodiments, the sensor component includes an air flow sensor or a sound sensor. Alternatively, the sensor component can include a microphone. The plurality of categories include a category of vibration, a category of sound, and a category of a blow of air. The electronic control circuitry is operable to change a movement of the flame element based on the electrical signal and the category of the electrical signal. The imitation candle device may further comprise a waveform generator implemented at least partially in electronic circuitry to produce an electrical waveform based on the electrical signal.

In some embodiments, the electronic control circuitry includes a waveform detection unit operable to classify the electrical waveform. The waveform detection unit includes a low-voltage detection unit operable to detect a voltage level that is below a predetermined threshold and to indicate whether the electrical signal is produced in response to the vibration. The electronic control circuitry is operable to control at least an output of the one or more light sources by comparing an amplitude of the electrical signal with at least two predetermined threshold values. For example, the electronic control circuitry is operable to turn off one or more light sources upon determining that the amplitude of the electrical signal is larger than a first predetermined threshold of the two predetermined threshold values. In some embodiments, the electronic control circuitry is operable to modify a flickering speed of one or more light sources upon determining that the amplitude of the electrical signal is smaller than the first predetermined threshold but lager than a second predetermined threshold of the two predetermined threshold values. The flickering speed is linearly correlated to the amplitude of the electrical signal.

In some embodiments, the electronic control circuitry is operable to control at least an output of the one or more light sources by comparing the electrical waveform with one or more voice control commands. The electronic control circuitry may also be operable to control a movement of the flame element by comparing the electrical waveform with one or more voice control commands. The imitation candle device further comprises a recording component operable to record the one or more voice control commands and store the one or more voice commands in a memory device.

Figure 12:
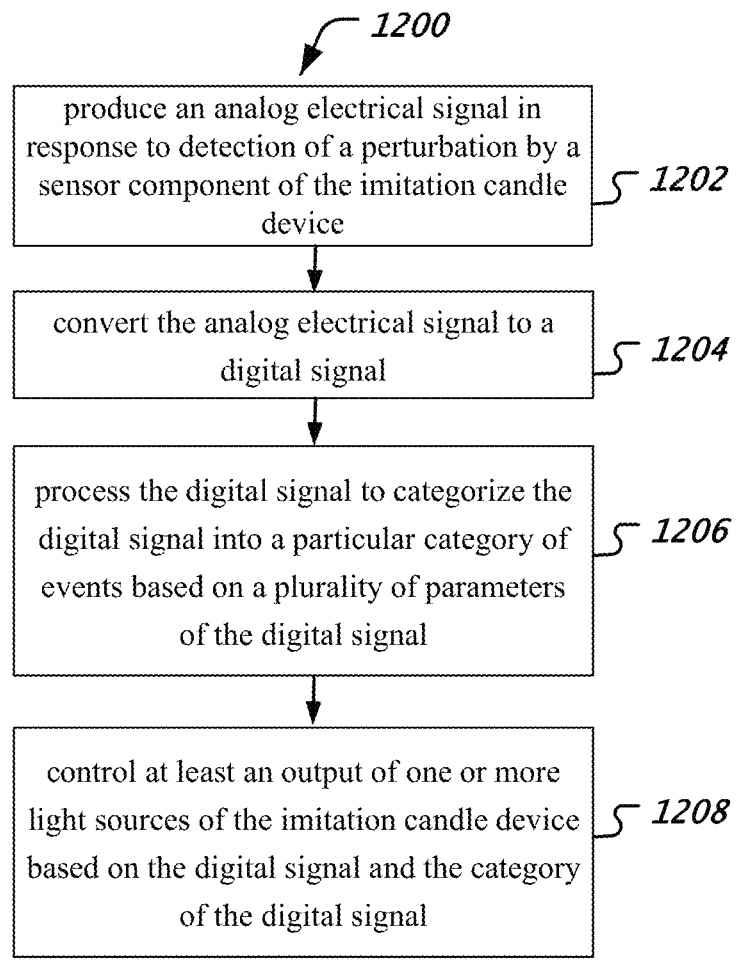
FIG. 12 shows an exemplary flowchart of a method of controlling an imitation candle device.

FIG. 12 shows a an exemplary flow chart for a method of controlling an imitation candle device. The method 1200 includes: at 1202, producing an analog electrical signal in response to detection of a perturbation by a sensor component of the imitation candle device; at 1204, converting the analog electrical signal to a digital signal; at 1206, processing the digital signal to categorize the digital signal into a particular category of events based on a plurality of parameters of the digital signal; and, at 1208, controlling at least an output of one or more light sources of the imitation candle device based on the digital signal and the category of the digital signal.

In some embodiments, the perturbation is one of a sound, a vibration, or a blow of air. The processing of the digital signals includes detecting an voltage level that is received by a control circuitry of the imitation candle device; classifying the digital signal into a vibration category of events upon determining that the input voltage level is substantially lower than a voltage level of a power source of the imitation candle device; determining, upon a detection that the input voltage level is substantially similar to the voltage level of the power source, whether a current cycle of the digital signal is from a blow-off action based on the parameters of the digital signal; and classifying the digital signal into either a blow-off category or a sound category of events.

In some embodiments, the classifying the digital signal into either a blow-off category or a sound category of events includes incrementing a counter to count a number of cycles of the digital signal that form a valid blow-off signal, classifying the digital signal into a blow-off category of events upon determining that the counter is larger than a predetermined threshold value within a predetermined time interval, and classifying the digital signal into a sound category of events upon determining that the counter is smaller than the predetermined threshold value within the predetermined time interval. In some implementations, for example, the predetermined threshold value is in a range of five to twenty, and the predetermined time interval is in a range of 50 to 200 ms.

In some embodiments, the parameters of the digital signal include a high amplitude signal duration of a cycle of the digital signal and a low amplitude signal duration of a cycle of the digital signal. The parameters may further include a frequency of the digital signal and an maximal amplitude of the digital signal. The determining whether a current cycle of the digital signal is from a blow-off action comprises determining whether a high amplitude signal duration is within a first predetermined range, and determining whether a low amplitude signal length is within a second predetermined range. The first predetermined range can be between 2 ms to 300 ms. The second predetermined range can be between 1.5 ms to 10 ms.

In some embodiments, the controlling includes turning off the one or more light sources of the imitation candle device upon determining that the digital signal is in the blow-off category and an amplitude of the digital signal exceeds a first amplitude threshold. The controlling may further include changing a flickering speed of the one or more light sources upon determining that the digital signal is classified in the blow-off category, and the amplitude of the digital signal is smaller than the first amplitude threshold and bigger than a second amplitude threshold. The controlling can also include controlling the flickering speed, wherein the flickering speed has a linear relationship with respect to the amplitude of the digital signal, and switching the one or more light sources of the imitation candle device to a particular mode of operation upon determining that the digital signal is in the sound category and the digital signal matches a voice control command indicative of the particular mode of operation.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. An imitation candle device, comprising:
   a body;
   a flame element protruding from top of the body;
   one or more light sources providing illumination for the flame element to produce an appearance of a true fire flame;
   a tapered chamber with an opening, wherein the opening is flush with respect to a top surface of the body and positioned in proximity to the flame element;
   a sensor component positioned at an end of the tapered chamber, the sensor component operable to produce an electrical signal in response to an acoustic signal, a blow of air, or a vibration;
   a power supply; and
   an electronic control circuitry coupled to the power supply and to the sensor component operable to:
      receive the electrical signal produced in response to the acoustic signal, a blow of air, or vibration,
      classify the electrical signal into a category among a plurality of categories, and
      control at least an output of the one or more light sources based on the electrical signal and the category of the electrical signal.

2. The imitation candle device of claim 1, wherein the sensor component includes an air flow sensor.

3. The imitation candle device of claim 1, wherein the sensor component includes a sound sensor.

4. The imitation candle device of claim 1, wherein the sensor component includes microphone.

5. The imitation candle device of claim 1, wherein the plurality of categories includes a category of vibration, a category of sound, and a category of a blow of air.

6. The imitation candle device of claim 1, wherein the electronic control circuitry is operable to change a movement of the flame element based on the electrical signal and the category of the electrical signal.

7. The imitation candle device of claim 1, further comprising a waveform generator implemented at least partially in electronic circuitry to produce an electrical waveform based on the electrical signal.

8. The imitation candle device of claim 7, wherein the electronic control circuitry includes a waveform detection unit operable to classify the electrical waveform.

9. The imitation candle device of claim 8, wherein the waveform detection unit includes a low-voltage detection unit operable to detect a voltage level that is below a predetermined threshold and to indicate whether the electrical signal is produced in response to the vibration.

10. The imitation candle device of claim 1, wherein the electronic control circuitry is operable to control at least an output of the one or more light sources by comparing an amplitude of the electrical signal with at least two predetermined threshold values.

11. The imitation candle device of claim 10, wherein the electronic control circuitry is operable to turn off one or more light sources upon determining that the amplitude of the electrical signal is larger than a first predetermined threshold of the two predetermined threshold values.

12. The imitation candle device of claim 10, wherein the electronic control circuitry is operable to modify a flickering speed of the one or more light sources upon determining that the amplitude of the electrical signal is smaller than the first predetermined threshold but lager than a second predetermined threshold of the two predetermined threshold values.

13. The imitation candle device of claim 12, wherein the flickering speed is linearly correlated to the amplitude of the electrical signal.

14. The imitation candle device of claim 7, wherein the electronic control circuitry is operable to control at least an output of the one or more light sources by comparing the electrical waveform with one or more voice control commands.

15. The imitation candle device of claim 7, wherein the electronic control circuitry is operable to control a movement of the flame element by comparing the electrical waveform with one or more voice control commands.

16. The imitation candle device of claim 14, further comprising a recording component operable to record the one or more voice control commands and store the one or more voice commands in a memory device.

17. A method of controlling an imitation candle device, comprising:
   producing an analog electrical signal in response to detection of a perturbation by a sensor component of the imitation candle device,
   converting the analog electrical signal to a digital signal,
   processing the digital signal to categorize the digital signal into a particular category of events based on a plurality of parameters of the digital signal, and
   controlling at least an output of one or more light sources of the imitation candle device based on the digital signal and the category of the digital signal.

18. The method of claim 17, wherein the perturbation is one of a sound, a vibration, or a blow of air.

19. The method of claim 17, wherein the processing of the digital signals includes:
   detecting an voltage level that is received by a control circuitry of the imitation candle device;
   classifying the digital signal into a vibration category of events upon determining that the input voltage level is substantially lower than a voltage level of a power source of the imitation candle device;
   determining, upon a detection that the input voltage level is substantially similar to the voltage level of the power source, whether a current cycle of the digital signal is from a blow-off action based on the parameters of the digital signal; and
   classifying the digital signal into either a blow-off category or a sound category of events.

20. The method of claim 19, wherein the classifying the digital signal into either a blow-off category or a sound category of events includes:
   incrementing a counter to count a number of cycles of the digital signal that form a valid blow-off signal,
   classifying the digital signal into a blow-off category of events upon determining that the counter is larger than a predetermined threshold value within a predetermined time interval, and
   classifying the digital signal into a sound category of events upon determining that the counter is smaller than the predetermined threshold value within the predetermined time interval.

21. The method of claim 20, wherein the predetermined threshold value is in a range of five to twenty.

22. The method of claim 20, wherein the predetermined time interval is in a range of 50 to 200 ms.

23. The method of claim 17, wherein the parameters of the digital signal include:
   a high amplitude signal duration of a cycle of the digital signal; and
   a low amplitude signal duration of a cycle of the digital signal.

24. The method of claim 23, wherein the parameters further include a frequency of the digital signal and an maximal amplitude of the digital signal.

25. The method of claim 19, wherein the determining whether a current cycle of the digital signal is from a blow-off action comprises:
   determining whether a high amplitude signal duration is within a first predetermined range; and
   determining whether a low amplitude signal length is within a second predetermined range.

26. The method of claim 25, wherein the first predetermined range is between 2 ms to 300 ms.

27. The method of claim 25, wherein the second predetermined range is between 1.5 ms to 10 ms.

28. The method of claim 17, wherein the controlling includes:
   turning off the one or more light sources of the imitation candle device upon determining that the digital signal is in the blow-off category and an amplitude of the digital signal exceeds a first amplitude threshold.

29. The method of claim 28, wherein the controlling includes:
   changing a flickering speed of the one or more light sources upon determining that:
      the digital signal is classified in the blow-off category, and
      the amplitude of the digital signal is smaller than the first amplitude threshold and bigger than a second amplitude threshold.

30. The method of claim 29, wherein the controlling further includes:
   controlling the flickering speed, wherein the flickering speed has a linear relationship with respect to the amplitude of the digital signal.

31. The method of claim 17, wherein the controlling includes:
   switching the one or more light sources of the imitation candle device to a particular mode of operation upon determining that the digital signal is in the sound category and the digital signal matches a voice control command indicative of the particular mode of operation.

* * * * *